US012576593B2

(12) United States Patent
Gozu

(10) Patent No.: US 12,576,593 B2
(45) Date of Patent: Mar. 17, 2026

(54) PLASTICIZING DEVICE, THREE DIMENSIONAL MOLDING DEVICE, AND INJECTION MOLDING DEVICE

(71) Applicant: SEIKO EPSON CORPORATION, Tokyo (JP)

(72) Inventor: Masayuki Gozu, Ina (JP)

(73) Assignee: SEIKO EPSON CORPORATION (JP)

( * ) Notice: Subject to any disclaimer, the term of this patent is extended or adjusted under 35 U.S.C. 154(b) by 113 days.

(21) Appl. No.: 18/419,864

(22) Filed: Jan. 23, 2024

(65) Prior Publication Data

US 2024/0246295 A1 Jul. 25, 2024

(30) Foreign Application Priority Data

Jan. 24, 2023 (JP) ................................. 2023-008535

(51) Int. Cl.
*B29C 64/343* (2017.01)
*B29C 45/58* (2006.01)
(Continued)

(52) U.S. Cl.
CPC .......... *B29C 64/343* (2017.08); *B29C 64/329* (2017.08); *B33Y 30/00* (2014.12);
(Continued)

(58) Field of Classification Search
CPC ... B29C 64/343; B29C 64/329; B29C 64/209; B29C 64/118; B29C 64/393; B29C 45/58; B29C 45/60
See application file for complete search history.

(56) References Cited

U.S. PATENT DOCUMENTS 3,266,677 A * 8/1966 Hamilton .............. B30B 15/302
222/410
2009/0004325 A1* 1/2009 Bacher ................... B29B 7/728
425/586
(Continued)

FOREIGN PATENT DOCUMENTS

GB 2523313 A * 8/2015 .......... B65D 90/587
JP 2022-036539 A 3/2022
JP 2022-191647 A 12/2022

*Primary Examiner* — Galen H Hauth
*Assistant Examiner* — Mohamed K Ahmed Ali
(74) *Attorney, Agent, or Firm* — Harness, Dickey & Pierce, P.L.C.

(57) ABSTRACT

A plasticizing device includes a material storage section having a first input port and a second input port and storing plasticization material; a plasticizing section having a supply port to which the plasticization material is supplied and plasticizing at least part of the plasticization material to generate a molding material; a connecting pipe having a connecting path connecting the first and the second input port to the supply port; and a controller, wherein the material storage section includes a first supply mechanism configured to adjust the supply amount of the plasticization material from the first input port to the connecting path and a second supply mechanism configured to adjust the supply amount of the plasticization material from the second input port to the connecting path and the controller controls at least one of the first and the second supply mechanism to supply the plasticization material to the connecting path.

12 Claims, 18 Drawing Sheets

(51) Int. Cl.

| | | |
|---|---|---|
| *B29C 64/209* | (2017.01) | |
| *B29C 64/329* | (2017.01) | |
| *B33Y 30/00* | (2015.01) | |
| *B33Y 40/10* | (2020.01) | |
| *B33Y 50/02* | (2015.01) | |

(52) U.S. Cl.
CPC .............. *B33Y 40/10* (2020.01); *B33Y 50/02* (2014.12); *B29C 45/58* (2013.01); *B29C 64/209* (2017.08)

(56)     References Cited

U.S. PATENT DOCUMENTS

2020/0139629  A1*     5/2020   Yokota .................. B29C 64/255
2022/0055275  A1      2/2022   Maruyama et al.
2022/0402210  A1     12/2022   Gozu

* cited by examiner

1

PLASTICIZING DEVICE, THREE DIMENSIONAL MOLDING DEVICE, AND INJECTION MOLDING DEVICE

The present application is based on, and claims priority from JP Application Serial Number 2023-008535, filed Jan. 24, 2023, the disclosure of which is hereby incorporated by reference herein in its entirety.

BACKGROUND

1. Technical Field

The present disclosure relates to a plasticizing device, a three dimensional molding device, and an injection molding device.

2. Related Art

JP-A-2022-36539 discloses a material supply mechanism for supplying material to a plasticizing mechanism provided in an injection molding device or a three dimensional molding device. This material supply mechanism includes a housing for accommodating the material, and a rotating member accommodated in the housing and rotatable along an inner edge of the housing. A through hole is formed in the rotating member. When the rotation member rotates and the through hole and an introduction port connected to the plasticizing mechanism communicate with each other, the material is supplied to the plasticizing mechanism through the through hole and the introduction port.

When an operation failure occurs in the material supply mechanism, molding of a three dimensional molded object by the three dimensional molding device or manufacturing of a molded article by the injection molding device may be interrupted.

SUMMARY

According to a first aspect of the present disclosure, a plasticizing device is provided.

This plasticizing device includes a material storage section having a first input port and a second input port and storing plasticization material; a plasticizing section that has a supply port to which the plasticization material is supplied and that plasticizes at least part of the plasticization material to generate a molding material; a connecting pipe having a connecting path connecting the first input port and the second input port to the supply port; and a control section, wherein the material storage section includes a first supply mechanism configured to adjust the supply amount of the plasticization material from the first input port to the connecting path and a second supply mechanism configured to adjust the supply amount of the plasticization material from the second input port to the connecting path and the control section controls at least one of the first supply mechanism and the second supply mechanism to supply the plasticization material to the connecting path.

According to a second aspect of the present disclosure, a three dimensional molding device is provided.

This three dimensional molding device includes above described plasticizing device and a nozzle configured to eject the molding material toward a stage.

According to a third aspect of the present disclosure, an injection molding device is provided.

This Injection molding device includes above described plasticizing device and a nozzle configured to inject molding material into a molding die.

DESCRIPTION OF EMBODIMENTS

A. First Embodiment

Figure 1:
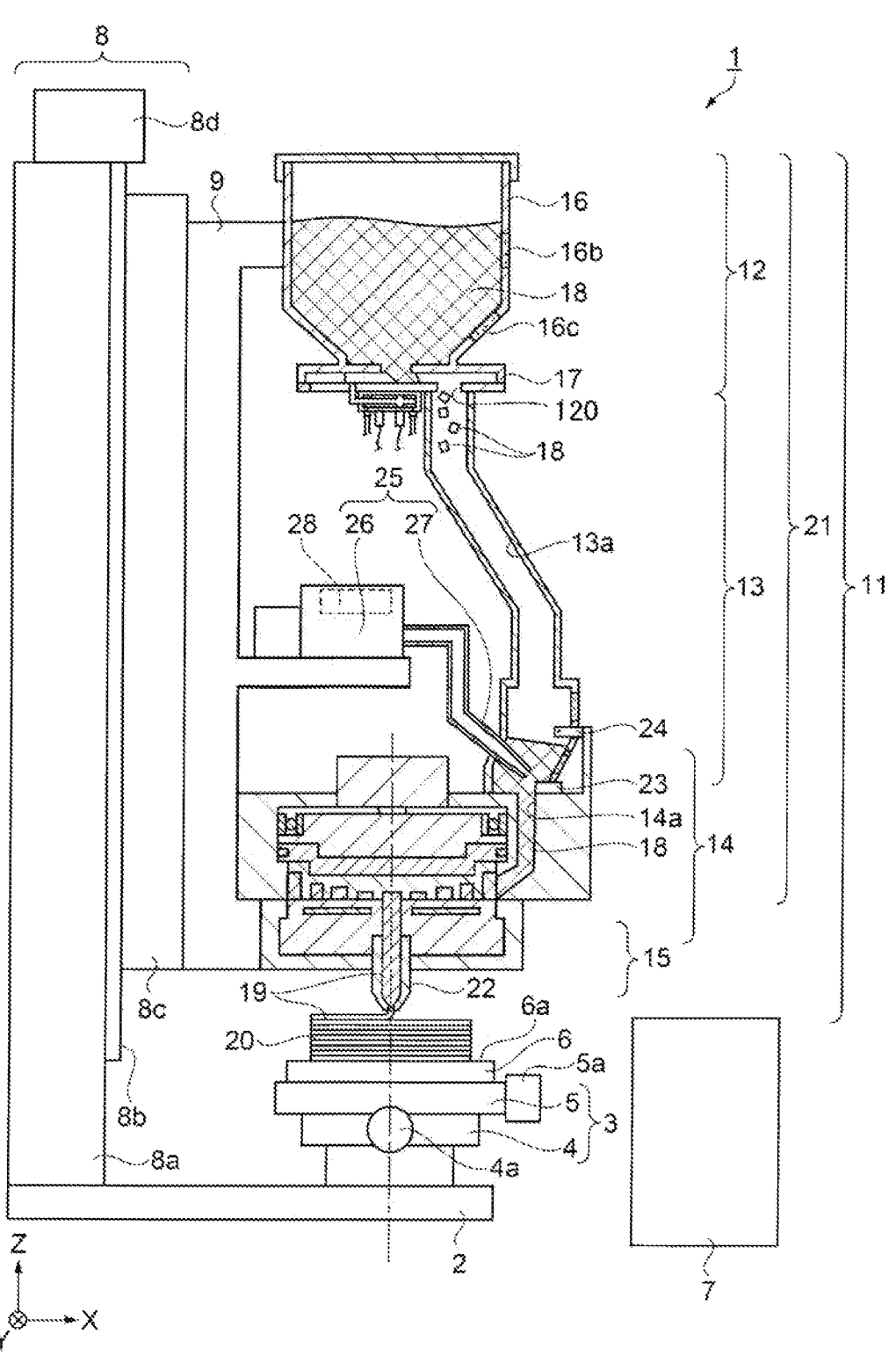
FIG. 1 is a schematic view showing a configuration of a three dimensional molding device including a plasticizing device.

FIG. 1 is a schematic diagram showing a configuration of a three dimensional molding device 1 including a plasticizing device 21. In FIG. 1, arrows along X, Y, and Z directions orthogonal to each other are shown. The direction of the arrow is the + direction of each direction, and the opposite direction is the − direction. The terms "X direction", "Y direction", and "Z direction" include both + and − directions. The X direction and the Y direction are directions along a horizontal direction, and the Z direction is a direction along a vertical direction. A gravity direction is the −Z direction.

The three dimensional molding device 1 includes a base 2. An XY table 3 as a moving section is installed on the base 2. The XY table 3 is configured by stacking and installing a Y table 4 and an X table 5 in this order in the +Z direction. A stage 6 is stacking and installing on the XY table 3.

The Y table 4 includes a Y axial motor 4a, a ball screw, a Y axial scale, and the like. The Y table 4 moves the stage 6 in the Y direction. The X table 5 includes an X axial motor 5a, a ball screw, an X axial scale, and the like. The X table 5 moves the stage 6 in the X direction.

The three dimensional molding device 1 is provided with a control section 7. The control section 7 is configured as a computer including a CPU and a storage section. The CPU controls each section of the three dimensional molding device 1 by executing a program stored in the storage section. The control section 7 may be constituted by a circuit.

The control section 7 controls the movement of the Y table 4 and the X table 5. The control section 7 recognizes the position of the stage 6 in the Y direction based on the information output from the Y axial scale. The control section 7 recognizes the position of the stage 6 in the X direction based on information output from the X axial scale. The control section 7 moves the Y table 4 and the X table 5 so as to eliminate the difference between the target position to which the stage 6 is moved and the current position. The control section 7 controls trajectory of the movement of the stage 6 by sequentially changing the target position to which the stage 6 is moved.

A raising/lowering table 8 as a moving part is installed on the base 2 on the +X direction side. The raising/lowering table 8 is provided with a fixed table 8a, and the fixed table 8a is stood on a base 2. A rail 8b is installed on the fixed table 8a on the +X direction side surface. A moving table 8c is installed on the +X direction side of the rail 8b. The moving table 8c is moved in the Z direction along the rail 8b.

A Z axial motor 8d is installed on the +Z direction side of the fixed table 8a. The fixed table 8a includes a ball screw and a Z axial scale therein. Similarly to the Y table 4 and the X table 5, the control section 7 controls trajectory of the movement of the moving table 8c. The moving section includes the XY table 3 and the raising/lowering table 8.

A unit support section 9 is installed on the +X direction side of the moving table 8c. A molding unit 11 is installed on the +X direction side of the unit support section 9. The unit support section 9 supports the molding unit 11. In the molding unit 11, a material storage section 12, a connecting pipe 13, a plasticizing section 14, and an ejection section 15 are installed in this order in the −Z direction.

The material storage section 12 includes a vessel 16 having a cavity therein and a material supply mechanism 17. Plasticization material 18 is stored inside the vessel 16. "Plasticization material" refers to a material that is to be plasticized by the plasticizing section 14. The plasticization material 18 used in the present embodiment resin pellets. A resin pellet is a lump of resin. The size of the resin pellets is not particularly limited, but is in the range of, for example, 5 mm to 20 mm in the present embodiment. The material supply mechanism 17 is provided with an input port 120. The connecting pipe 13 includes a connecting path 13a therein. The material supply mechanism 17 supplies the plasticization material 18 from the input port 120 to the connecting path 13a. The vessel 16 includes a third window 16b and a fourth window 16c. The third window 16b and the fourth window 16c are formed by a transparent material such as glass. The third window 16b is disposed at the +Z direction side of the vessel 16. The fourth window 16c is disposed at the −Z direction side of the vessel 16. The remaining amount of the plasticization material 18 in the vessel 16 is observed through the third window 16b and the fourth window 16c.

The connecting pipe 13 is connected with the input port 120 of the material storage section 12. The plasticization material 18 is moved from inside the material storage section 12 into the connecting pipe 13 by its own weight. The connecting pipe 13 is connected with the plasticizing section 14. The plasticizing section 14 has a supply port 14a that communicates with the input port 120. The connecting path 13a connects the input port 120 and the supply port 14a. The plasticization material 18 is supplied from the connecting pipe 13 to the plasticizing section 14. The plasticization material 18 may contain other materials such as metal and ceramic in addition to a thermoplastic material. In addition, in a case where metal powder, ceramic powder, or the like is included in the plasticization material 18, not all of the plasticization material 18 is plasticized in the plasticizing section 14, and thus at least a part of the plasticization material 18 is plasticized in the plasticizing section 14.

The plasticizing section 14 plasticizes at least a part of the plasticization material 18. "Plasticization" is a concept including melting, and is a change from a solid to a state having fluidity. Specifically, in the case of a material in which glass transition occurs, plasticization means that the temperature of the material is set to be equal to or higher than the glass transition point. In the case of a material that does not undergo glass transition, plasticization refers to raising the temperature of the material above its melting point. The plasticizing section 14 plasticizes the plasticization material 18 to generate the molding material 19. The material storage section 12, the connecting pipe 13, the plasticizing section 14, the control section 7, and the like constitute the plasticizing device 21.

The plasticizing section 14 is connected with the ejection section 15. The ejection section 15 includes a nozzle 22. The stage 6 has a molding surface 6a. A surface of the stage 6 on the nozzle 22 side is the molding surface 6a. The nozzle 22 ejects the molding material 19 supplied from the plasticizing device 21 toward the molding surface 6a of the stage 6. The molding surface 6a of the stage 6 receives the molding material 19 ejected from the nozzle 22. While the nozzle 22 ejects the molding material 19, the control section 7 drives the XY table 3 to move the stage 6 in the X direction and the Y direction. By this, the three dimensional molding device 1 forms a layer of a predetermined pattern on the stage 6.

Next, the raising/lowering table 8 moves the molding unit 11 in the +Z direction by a predetermined distance. The three dimensional molding device 1 forms a second layer on the first layer. Further, the three dimensional molding device 1 molds a three dimensional molded object 20 by sequentially molding a third and subsequent layers.

The plasticizing section 14 is disposed below the material storage section 12 in the gravity direction. The raising/lowering table 8 moves the plasticizing section 14 and the material storage section 12 relative to the stage 6. The raising/lowering table 8 moves the material storage section 12 in conjunction with the movement of the plasticizing section 14. According to this configuration, since the plasticizing section 14 and the material storage section 12 move in conjunction with each other, deformation of the connecting pipe 13 is suppressed when the plasticizing section 14 and the material storage section 12 move. Therefore, the connecting pipe 13 can be shortened as compared with the case where the connecting pipe 13 is deformed.

The XY table 3 moves the molding surface 6a in a direction along the molding surface 6a. The raising/lowering table 8 moves the plasticizing section 14 and the material storage section 12 in a direction perpendicular to the molding surface 6a. According to this configuration, the plasticizing section 14 and the material storage section 12 move in the gravity direction and a direction opposite to the gravity direction. Since the plasticizing section 14 and the material storage section 12 have large inertia, it is possible to move the plasticizing section 14 and the material storage section 12 faster than when moving them along a plane orthogonal to the gravitational acceleration direction.

A first material sensor 23 and a second material sensor 24 are installed on the plasticizing section 14 side of the connecting path 13a. The first material sensor 23 and the second material sensor 24 detect the remaining amount of the plasticization material 18 in the connecting path 13a. The second material sensor 24 is disposed between the first material sensor 23 and the input port 120. The scheme by which the first material sensor 23 and the second material sensor 24 detect the plasticization material 18 is not particularly limited, but in the present embodiment, for example, an optical method is adopted.

The plasticizing device 21 includes a blower section 25 between the material storage section 12 and the plasticizing section 14. The blower section 25 is installed in the unit support section 9. The blower section 25 is raised and lowered in conjunction with the plasticizing section 14 and the connecting pipe 13. The blower section 25 includes a blower fan 26 and a blower nozzle 27. The blower fan 26 generates air flow and sends it to the blower nozzle 27. The blower nozzle 27 is installed toward the first material sensor 23. The blower section 25 blows air from the blower nozzle 27 toward the first material sensor 23. According to this configuration, it is possible to blow off the powdered plasticization material 18 or dust that adheres to the first material sensor 23. Reduction in sensitivity of the first material sensor 23 can be suppressed. The blowing may be performed continuously or at a predetermined interval.

The blower section 25 may be provided with the blower nozzle 27 for blowing air toward the second material sensor 24. It is possible to blow off the powdered plasticization material 18 or dust that adheres to the second material sensor 24. Reduction in sensitivity of the second material sensor 24 can be suppressed. Even when the plasticization material 18 exists between the blower nozzle 27 and the first material sensor 23 or the second material sensor 24, the blower section 25 may blow air toward the first material sensor 23 or the second material sensor 24.

The blower fan 26 includes an ionizer 28 therein. The ionizer 28 generates gas having a positive or a negative charge. Whether the charge of the gas is positive or negative can be set. The ionizer 28 may alternately generate positive and negative charges. The blower section 25 blows the gas having electric charges. According to this configuration, when the powdered plasticization material 18 or dust adheres to the first material sensor 23 due to static electricity, it is possible to easily remove the powdered plasticization material 18 or dust by electrical removal.

Figure 2:
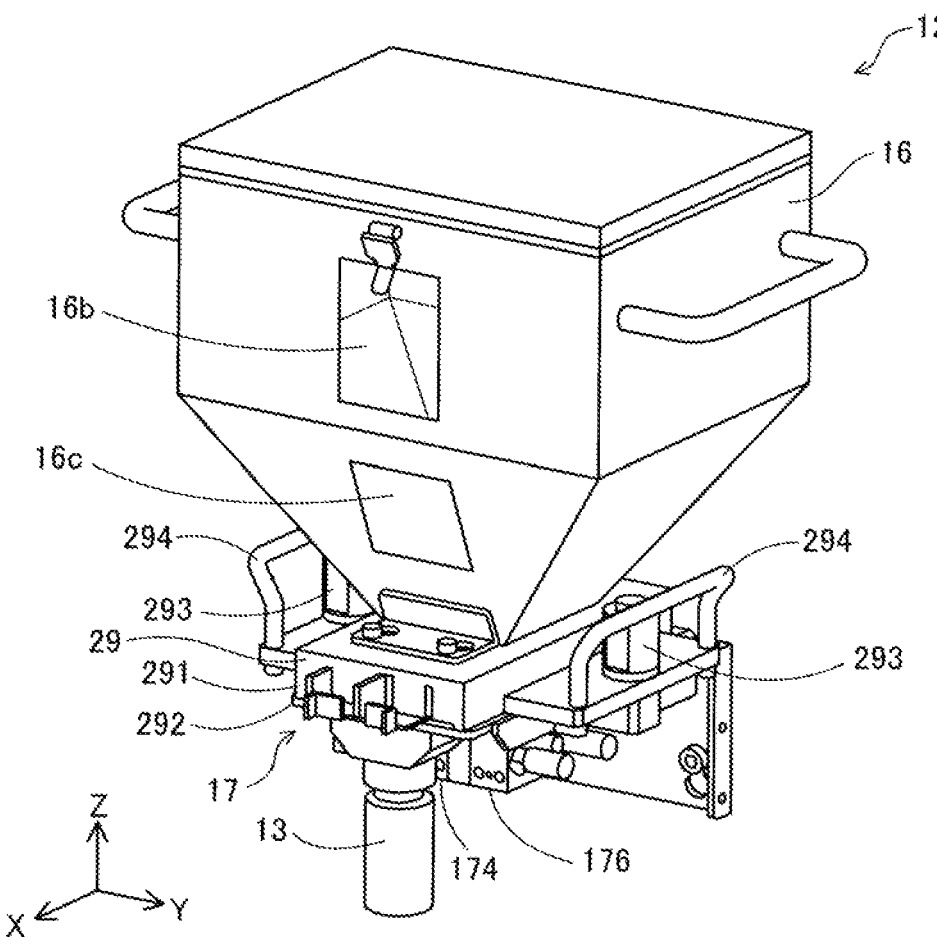
FIG. 2 is a perspective view showing a specific configuration of a material storage section.

FIG. 2 is a perspective view showing a specific configuration of the material storage section 12. The material storage section 12 includes the material supply mechanism 17. The material supply mechanism 17 includes a guide case 29. The inside of the guide case 29 is hollow. As will be described later, a plurality of slide members are disposed inside the guide case 29. The guide case 29 includes a lid section 291 and a bottom section 292. The vessel 16 is fixed to the lid section 291 by bolts. The lid section 291 and the bottom section 292 are coupled by a coupling device 293. The lid section 291 is provided with a handle 294. An operator can lift the lid section 291 together with the vessel 16 by lifting the lid section 291 with the handle 294 while releasing the coupling state between the lid section 291 and the bottom section 292 by the coupling device 293. Thus, the operator can perform maintenance on the slide members disposed in the guide case 29.

Figure 3:
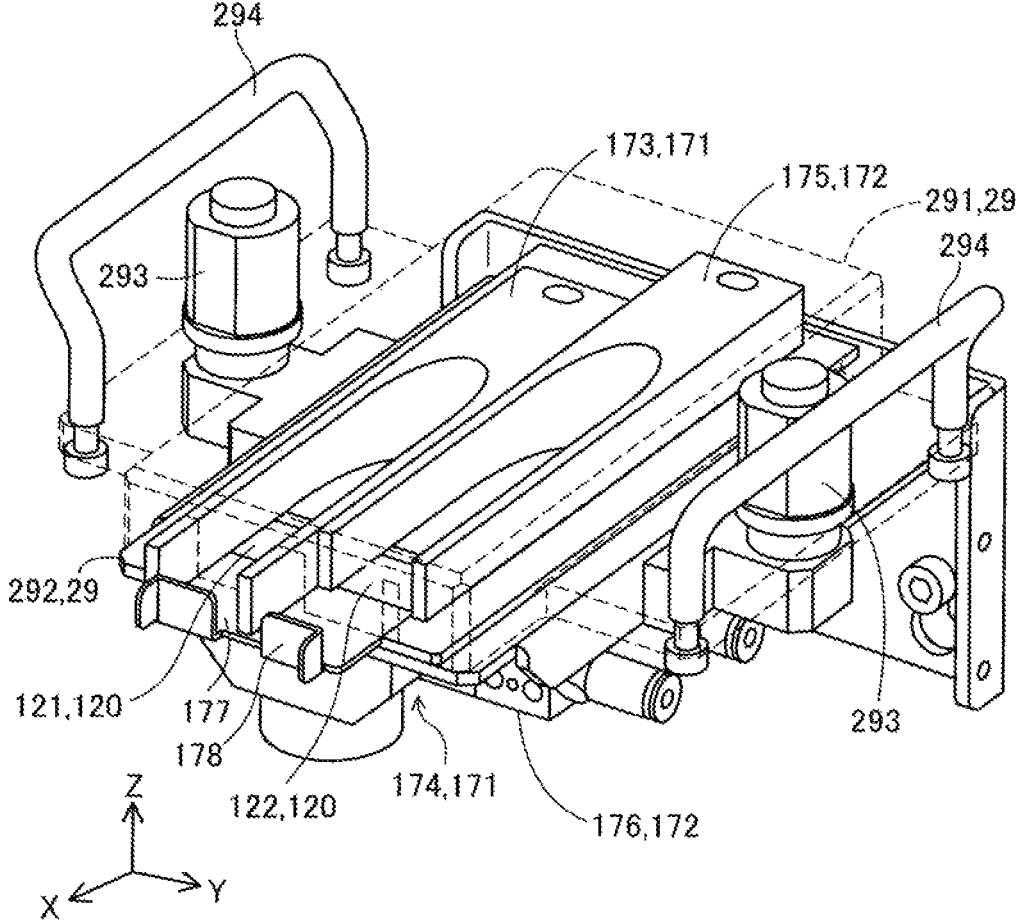
FIG. 3 is a perspective view showing an internal structure of a material supply mechanism.
Figure 4:
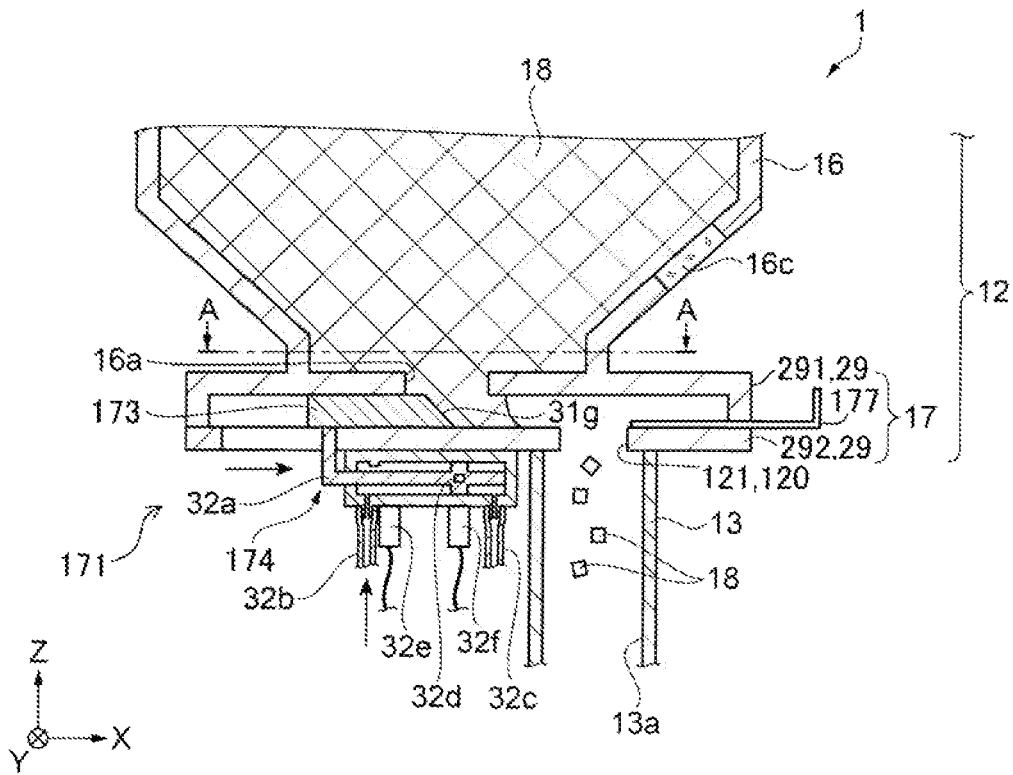
FIG. 4 is a first side cross-sectional view schematically showing the internal structure of the material supply mechanism.

FIG. 3 is a perspective view showing the internal structure of the material supply mechanism 17. FIG. 4 is a first side cross-sectional view schematically showing the internal structure of the material supply mechanism 17. As shown in FIG. 3, the material supply mechanism 17 includes a first supply mechanism 171 and a second supply mechanism 172. The first supply mechanism 171 includes a first slide member 173 and a first slide drive section 174 that slides the first slide member 173. The second supply mechanism 172 includes a second slide member 175 and a second slide drive section 176 that slides the second slide member 175. FIG. 4 shows a cross section of the first supply mechanism 171 of the first supply mechanism 171 and the second supply mechanism 172. Each of the first slide member 173 and the second slide member 175 functions as a material intermittent-supply plate that supplies a predetermined amount of the plasticization material to the plasticizing section 14 through the connecting path 13a. Each of the first slide member 173 and the second slide member 175 slides and reciprocates in the X direction inside the guide case 29. Hereinafter, when the first slide member 173 and the second slide member 175 are not distinguished from each other, they are simply referred to as slide members. When the first slide drive section 174 and the second slide drive section 176 are not distinguished from each other, they are simply referred to as slide drive sections.

As shown in FIG. 4, the guide case 29 is provided with a material inlet 16a on a surface on the vessel 16 side, that is, on an upper surface. The guide case 29 is provided with the input port 120 on a surface on the connecting pipe 13 side, that is, on a lower surface. The input port 120 is positioned on the +X direction side of the material inlet 16a. Therefore, the plasticization material 18 does not fall directly from the material inlet 16a to the input port 120. In the first embodiment, the material inlet 16a is provided in common with the first supply mechanism 171 and the second supply mechanism 172. In other words, the plasticization material 18 in the vessel 16 is supplied from one material inlet 16a to both the first supply mechanism 171 and the second supply mechanism 172. On the other hand, the input port 120 is individually provided for each of the first supply mechanism 171 and the second supply mechanism 172. Specifically, as shown in FIG. 3, a first input port 121 is provided so as to correspond to the first supply mechanism 171, and a second input port 122 is provided so as to correspond to the second supply mechanism 172.

Figure 5:
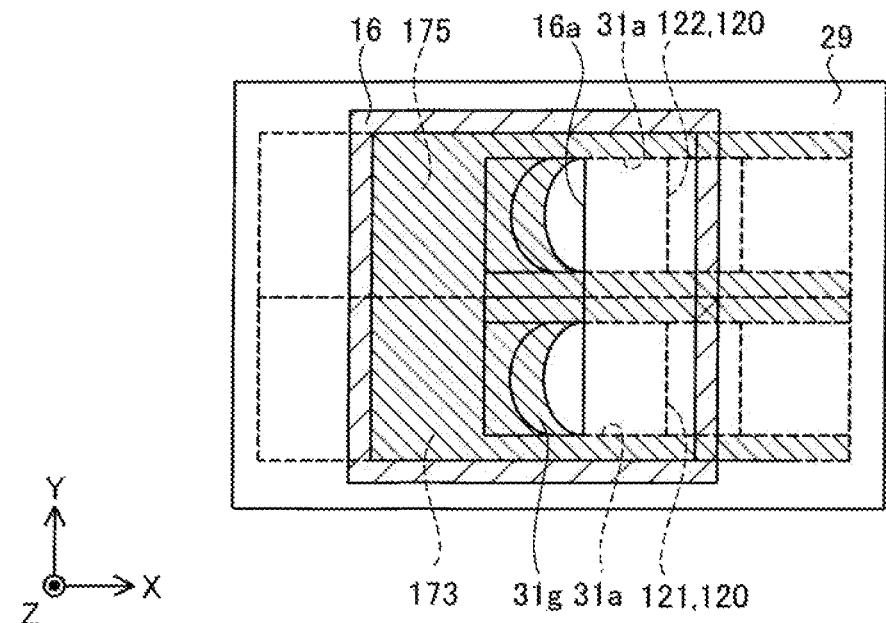
FIG. 5 is a first plan sectional view schematically showing a planar structure of the material supply mechanism.
Figure 6:
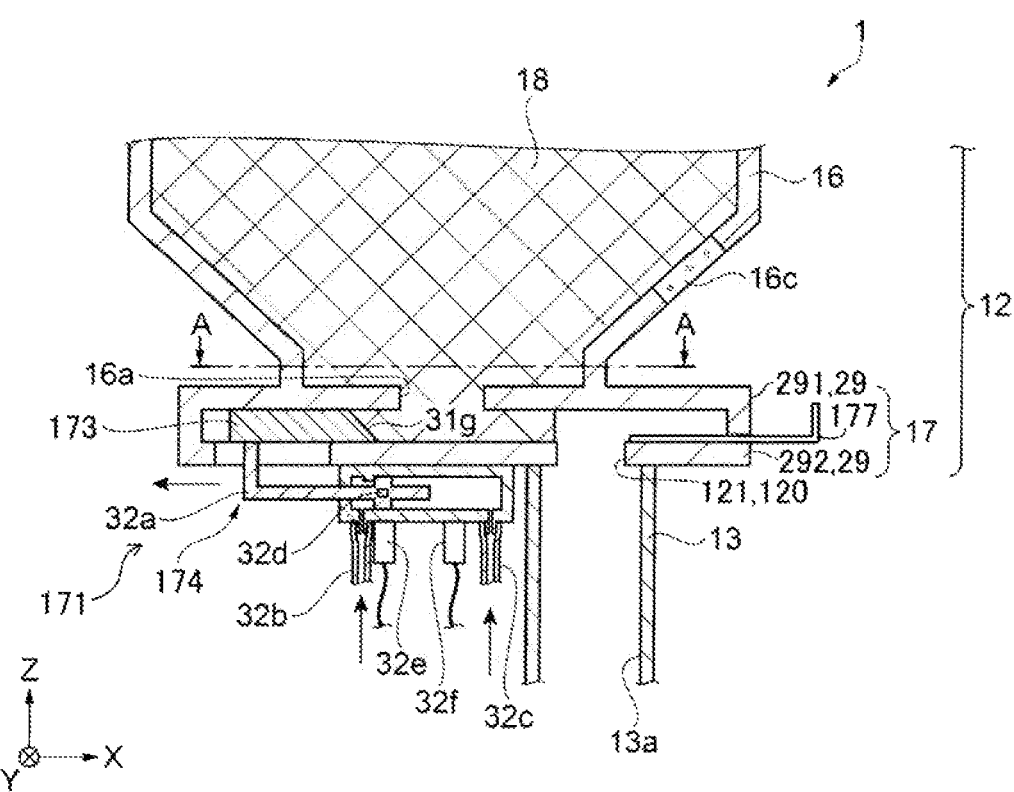
FIG. 6 is a second side cross-sectional view schematically showing the internal structure of the material supply mechanism.
Figure 7:
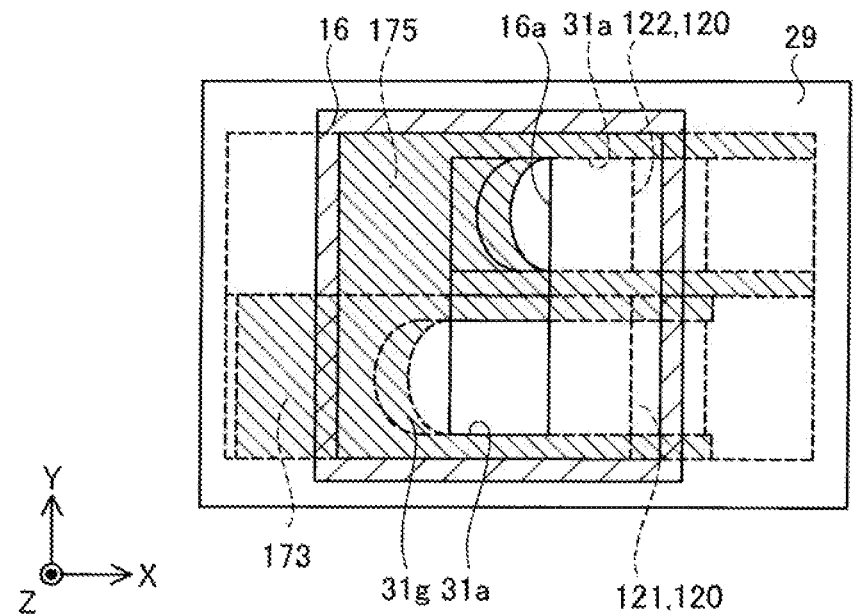
FIG. 7 is a second plan sectional view schematically showing the planar structure of the material supply mechanism.

FIG. 5 is a first plan sectional view schematically showing a planar structure of the material supply mechanism 17. FIG. 5 is a view of FIG. 4 as viewed from line AA. FIG. 6 is a second side cross-sectional view schematically showing the internal structure of the material supply mechanism 17. FIG. 7 is a second plan sectional view schematically showing the planar structure of the material supply mechanism 17. FIG. 7 is a view of FIG. 6 as viewed from line AA. In the first embodiment, the structure of the first supply mechanism 171 and the structure of the second supply mechanism 172 are the same. That is, the structure of the first slide member 173 and the structure of the second slide member 175 are the same. Further, the structure of the first slide drive section 174 and the structure of the second slide drive section 176 are the same. Therefore, hereinafter, the structures and operations of the first slide member 173 and the first slide drive section 174 will be mainly described with reference to FIGS. 4 to 7 and the detailed description of the second slide member 175 and the second slide drive section 176 of the second supply mechanism 172 will be omitted.

As shown in FIGS. 5 and 7, the first slide member 173 has a hole 31*a* through which the plasticization material passes. The hole 31*a* penetrates the first slide member 173 in the Z direction. The hole 31*a* provided in the first slide member 173 is referred to as a first hole. The hole 31*a* provided in the second slide member 175 is referred to as a second hole. In the present embodiment, the first slide member 173 is substantially U-shaped as viewed from the +Z direction due to the hole 31*a* formed therein. The side surface of the hole 31*a* on the −X direction side is curved in a semicircular arc shape as viewed from the +Z direction. The side surface of the hole 31*a* on the +X direction side is open. In the interior of guide case 29, the hole 31*a* is defined by a portion of the first slide member 173 other than the hole 31*a* and the inner surface of the guide case 29. As shown in FIG. 3, a hole through which an end portion of the first slide member 173 on the +X direction side can protrude to the outside when the first slide member 173 moves in the +X direction is formed in a +X direction side surface of the guide case 29.

As shown in FIGS. 4 and 6, the first slide drive section 174 for sliding the first slide member 173 is provided on the −Z direction side of the guide case 29. The first slide drive section 174 of the present embodiment is constituted by an air cylinder. The first slide drive section 174 is provided with a piston rod 32*a* inside. The piston rod 32*a* reciprocates in the X direction. One end of the piston rod 32*a* is fixed to the first slide member 173. Since one end of the piston rod 32*a* is fixed to the first slide member 173, the reciprocating movement of the first slide member 173 is interlocked with the reciprocating movement of the piston rod 32*a*.

The first slide drive section 174 includes a first pneumatic port 32*b* on the −X direction side. The first slide drive section 174 includes a second pneumatic port 32*c* on the +X direction side. When compressed air is supplied to the first pneumatic port 32*b*, the piston rod 32*a* and the first slide member 173 move in the positive X direction. When compressed air is supplied to the second pneumatic port 32*c*, the piston rod 32*a* and the first slide member 173 move in the −X direction.

The first pneumatic port 32*b* and the second pneumatic port 32*c* are connected to the electromagnetic valve by a pipe (not shown). A pipe for supplying compressed air is connected to the electromagnetic valve. The control section 7 controls the electromagnetic valve to supply compressed air to either the first pneumatic port 32*b* or the second pneumatic port 32*c*. In this way, the control section 7 controls the moving direction of the first slide member 173.

The piston rod 32*a* is provided with a magnet piece 32*d*. The first slide drive section 174 includes a first cylinder sensor 32*e* on the first pneumatic port 32*b* side. The first slide drive section 174 includes a second cylinder sensor 32*f* on the second pneumatic port 32*c* side. When the first slide member 173 moves in the +X direction, the first cylinder sensor 32*e* detects the magnet piece 32*d*. When the first slide member 173 moves in the −X direction, the second cylinder sensor 32*f* detects the magnet piece 32*d*. Accordingly, the first cylinder sensor 32*e* and the second cylinder sensor 32*f* detect whether the first slide member 173 is positioned on the +X direction side, positioned on the −X direction side, or positioned at the intermediate point.

As described above, in the present embodiment, the first slide drive section 174 and the second slide drive section 176 are configured by the air cylinder, but may be configured by electric actuators.

FIG. 4 shows a first state of the first slide member 173. In the first state, the first slide member 173 is positioned in the +X direction. FIG. 5 shows the position of the first slide member 173*a* and a positional relationship between the material inlet 16*a* and the input port 120, in the first state. In FIG. 5, the first slide member 173 is hatched downward to the right. As viewed from the +Z direction, in the first state, the first slide member 173 has moved in the +X direction. Therefore, a part of the plasticization material 18 in the hole 31*a* is pushed out and introduced into the connecting pipe 13. That is, in the first state, the plasticization material 18 in the material storage section 12 is supplied to the connecting path 13*a* of the connecting pipe 13. Note that in FIG. 5, the second slide member 175 is also in the first state.

A side surface of the hole 31*a* on the −X direction side is a slope 31*g*. The angle formed by the slope 31*g* and the X direction is desirably 25° or more and 35° or less. This angle is referred to as an angle of repose and is an angle at which the plasticization material 18 does not slip on the slope 31*g*. When the angle of the slope 31*g* is the angle of repose, the plasticization material 18 stays in the hole 31*a*, and thus the plasticization material 18 does not continuously flow from the material inlet 16*a* to the input port 120. Furthermore, clogging of the plasticization material 18 between the material inlet 16*a* and the slope 31*g* can be suppressed.

When compressed air is supplied from the second pneumatic port 32*c* to the first slide drive section 174, then as shown in FIGS. 6 and 7, the piston rod 32*a* moves in the −X direction and, in conjunction with this, the first slide member 173 moves in the −X direction. A state where the first slide member 173 is positioned in the −X direction is referred to as a second state. In FIG. 7, the first slide member 173 is hatched downward to the right. When viewed from the +Z direction, in the second state, the position of the slope 31*g* of the first slide member 173 is further to the −X direction side than in the first state. In the second state, the plasticization material 18 in the material storage section 12 is not introduced into the connecting pipe 13. That is, in the second state, the plasticization material 18 in the material storage section 12 is not supplied to the connecting path 13*a* of the connecting pipe 13. In FIG. 7, the second slide member 175 is in the first state.

In the present embodiment, as shown in FIGS. 5 and 7, the hole 31*a* of the first slide member 173 communicates with the first input port 121 in both the first state and the second state. That is, the size of the hole 31*a* of the first slide member 173 is a size communicating with the first input port 121 in both states of the first state and the second state.

As shown in FIG. 7, as viewed from the +Z direction, the overlapping areas of the material inlet 16*a* and the hole 31*a* in the second state are larger than those in the first state shown in FIG. 5. Therefore, the plasticization material 18 is easily discharged from the material inlet 16*a* and the plasticization material 18 is introduced into the hollow portion of the hole 31*a*. The control section 7 drives the first slide drive section 174 to alternately switch between the first state and the second state. When the first slide member 173 reciprocates once, a predetermined amount of the plasticization material 18 is introduced from the first input port 121 to the connecting path 13*a*. The control section 7 controls the amount of the plasticization material 18 to be introduced into the connecting path 13*a* by controlling the number of times of reciprocating the first slide member 173 and the reciprocating movement amount of the first slide member 173.

The first cylinder sensor 32*e* and the second cylinder sensor 32*f* described above also function as a biting detection sensor for detecting biting of the plasticization material 18 of the first slide member 173. Biting refers to the plasticization material 18 is caught between the first slide member 173 and the guide case 29 when the first slide member 173 is moved in the +X direction. When biting occurs, the second cylinder sensor 32*f* does not detect the magnet piece 32*d*. When the second cylinder sensor 32*f* does not detect the magnet piece 32*d*, the control section 7 judges that biting has occurred. Then, the control section 7 drives the first slide drive section 174 to move the first slide member 173 in the −X direction. In this way, when the second cylinder sensor 32*f* detects biting of the plasticization material 18, the first slide drive section 174 performs a return operation for sliding the first slide member 173 in the reverse direction.

It is also referred to as biting when the plasticization material 18 is caught between the first slide member 173 and the guide case 29 at the time the first slide member 173 moves in the −X direction. When this biting occurs, the first cylinder sensor 32*e* does not detect the magnet piece 32*d*. When the first cylinder sensor 32*e* does not detect the magnet piece 32*d* even after a predetermined period of time has elapsed, the control section 7 judges that biting has occurred. Then, the control section 7 drives the first slide drive section 174 to move the first slide member 173 in the +X direction. Thus, when the first cylinder sensor 32*e* detects biting of the plasticization material 18, the first slide drive section 174 performs the return operation for sliding the first slide member 173 in the reverse direction.

In this way, in a case where the first cylinder sensor 32*e* and the second cylinder sensor 32*f* detect biting of the plasticization material 18, the first slide drive section 174 slides the first slide member 173, and thus biting of the plasticization material 18 is eliminated. Therefore, biting of the plasticization material 18 can be eliminated without the intervention of the operator.

In the case where the first slide drive section 174 is constituted by an electric actuator, the control section 7 monitors the rotation angle of the electric motor constituting the electric actuator, and when the rotation angle does not change despite the application of the drive power, it can be judged that biting has occurred.

As shown in FIGS. 3 and 4, the material supply mechanism 17 of the present embodiment further includes a shutter mechanism 177. The shutter mechanism 177 is a mechanism for closing the input port 120. The shutter mechanism 177 has a plate-like shape extending in the +X direction from the inside to the outside of the guide case 29 through a gap formed between the lid section 291 and the bottom section 292 of the guide case 29. A portion of the shutter mechanism 177 extending to the outside of the guide case 29 is provided with an operation section 178 for pushing the shutter mechanism into the guide case 29 or pulling the shutter mechanism out of the guide case 29. The operator can prevent the plasticization material remaining in the vessel 16 from unintentionally falling into the connecting pipe 13 by closing the input port 120 by operating the shutter mechanism 177 before lifting the vessel 16 and the lid section 291 using the handle 294.

Figure 8:
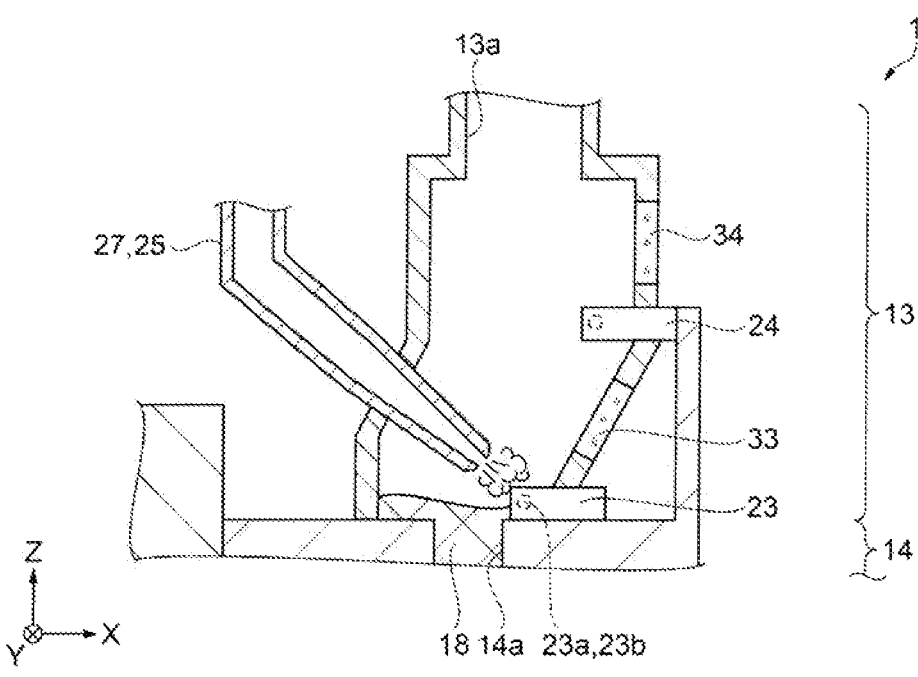
FIG. 8 is a schematic side cross-sectional view of a main part for explaining a structure of a connecting pipe.
Figure 9:
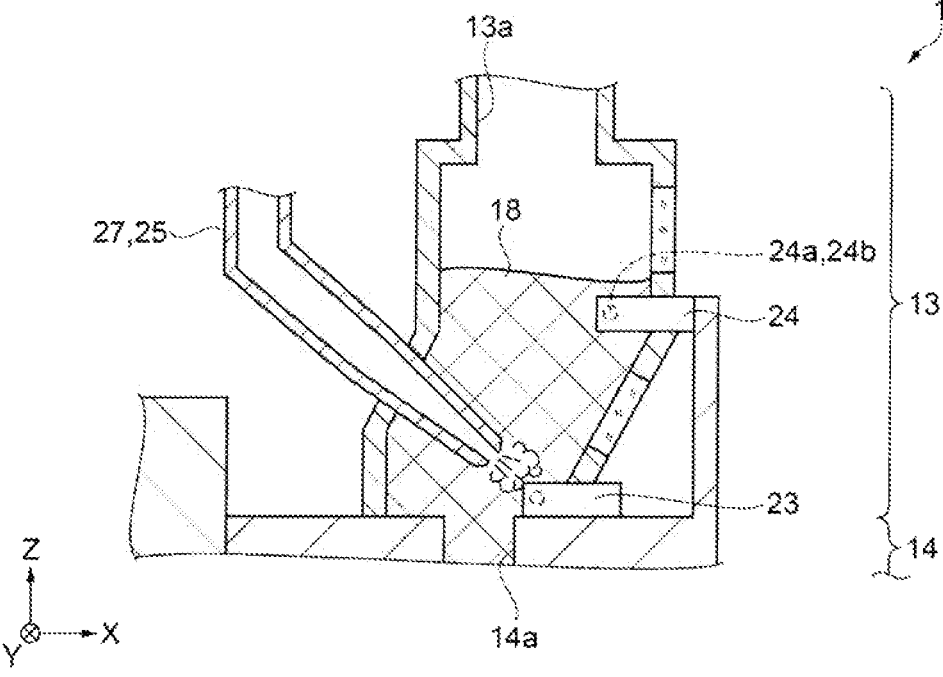
FIG. 9 is a schematic side cross-sectional view of the main part for explaining the structure of the connecting pipe.

FIGS. 8 and 9 are schematic side cross-sectional views of main part for explaining the structure of the connecting pipe 13. As shown in FIG. 8, the first material sensor 23 is configured such that a first light emitting section 23*a* and a first light receiving section 23*b* are disposed to face each other in the Y direction. When the plasticization material 18 in the connecting pipe 13 decreases, no plasticization material 18 will remain between the first light emitting section 23*a* and the first light receiving section 23*b*, and the first light receiving section 23*b* detects the light emitted by the first light emitting section 23*a*. At this time, the remaining amount of the plasticization material 18 existing inside the connecting pipe 13 is a first reference value. The first material sensor 23 detects that the remaining amount of the plasticization material 18 is less than the first reference value. When the remaining amount of the plasticization material 18 detected by the first material sensor 23 is less than the first reference value, the control section 7 operates the material supply mechanism 17 to supply the plasticization material 18 to the connecting path 13*a*.

The connecting pipe 13 includes a first window 33 as a transparent member and a second window 34 as a transparent member. The first window 33 and the second window 34 are formed by the transparent members such as glass. Therefore, the state of the inside of the connecting pipe 13 can be visually checked. As described above, at least a part of the connecting pipe 13 is formed of the transparent member. According to this configuration, the user can check the remaining amount of the plasticization material 18 held in the connecting path 13*a*.

As shown in FIG. 9, the second material sensor 24 is disposed between the first material sensor 23 and the input port 120. The second material sensor 24 is configured such that a second light emitting section 24*a* and a second light receiving section 24*b* are disposed to face each other in the Y direction. When the material supply mechanism 17 supplies the plasticization material 18 to the connecting path 13*a*, the plasticization material 18 gradually increases in the connecting path 13*a*. When the plasticization material 18 is not present between the second light emitting section 24*a* and the second light receiving section 24*b*, the second light receiving section 24*b* detects the light emitted by the second light emitting section 24*a*. When the plasticization material 18 is present between the second light emitting section 24*a* and the second light receiving section 24*b*, the second light receiving section 24*b* does not detect the light emitted by the second light emitting section 24*a*. When the plasticization material 18 is supplied to the second material sensor 24, the remaining amount of the plasticization material 18 existing inside the connecting pipe 13 is a second reference value. The second material sensor 24 detects that the remaining amount of the plasticization material 18 has reached the second reference value.

In the first material sensor 23, when the first light receiving section 23*b* detects the light emitted by the first light emitting section 23*a*, the control section 7 receives the signal output by the first material sensor 23 and determines that the remaining amount of the plasticization material 18 has decreased below the first reference value. At this time, the plasticization material 18 has not reached the second material sensor 24. In the second material sensor 24, the second light receiving section 24*b* detects the light emitted from the second light emitting section 24*a*. The control section 7 operates the material supply mechanism 17 to supply the plasticization material 18 to the connecting path 13*a*.

In the second material sensor 24, when the second light receiving section 24*b* does not detect the light emitted by the second light emitting section 24*a*, the control section 7 receives the signal output by the second material sensor 24 and determines that the remaining amount of the plasticization material 18 has reached the second reference value. The control section 7 stops the operation of the material supply mechanism 17 to stop the supply of the plasticization material 18 to the connecting path 13a.

In this way, when the remaining amount of the plasticization material 18 detected by the first material sensor 23 is less than the first reference value, the material supply mechanism 17 supplies the plasticization material 18 up to the second reference value, which is detected by the second material sensor 24.

Figure 10:
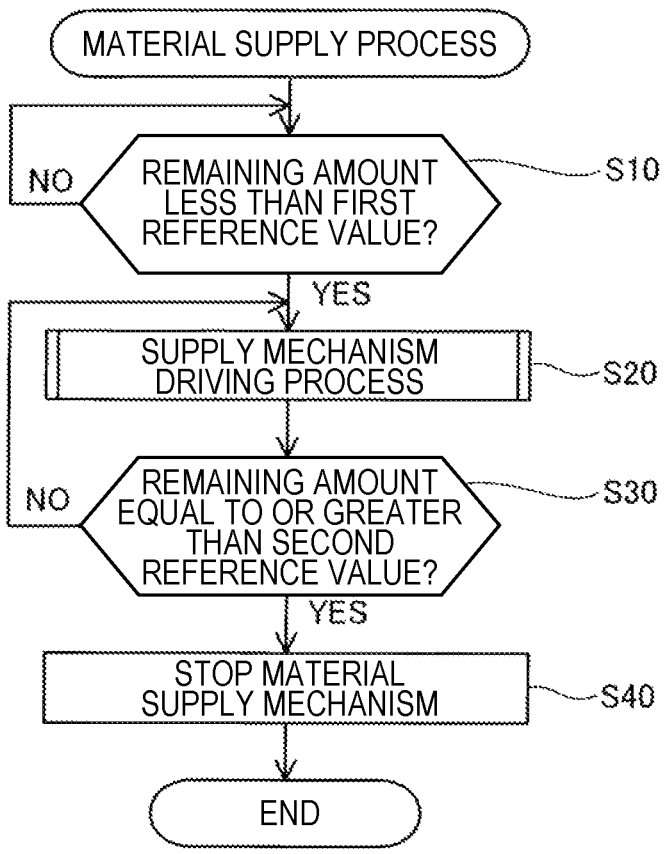
FIG. 10 is a flowchart of a material supply process executed by a control section.

FIG. 10 is a flowchart of the material supply process executed by the control section 7. The material supply process is repeatedly executed while the three dimensional molded object 20 is being molded by the three dimensional molding device 1.

In step S10, the control section 7 determines whether the remaining amount of the plasticization material 18 is less than the first reference value based on the output signal from the first material sensor 23. In a case where it is determined that the remaining amount of the plasticization material 18 is less than the first reference value, the control section 7 executes a supplying mechanism driving process in step S20, and supplies the plasticization material 18 from the material supply mechanism 17 to the connecting path 13a. The details of the supply mechanism driving process will be described later. In step S10, when it is determined that the remaining amount of the plasticization material 18 is not less than the first reference value, the control section 7 repeatedly executes the process of step S10.

In step S30, the control section 7 determines whether the remaining amount of the plasticization material 18 is equal to or greater than the second reference value based on the output signal from the second material sensor 24. When it is determined that the remaining amount of the plasticization material 18 is equal to or greater than the second reference value, the control section 7 stops drive of the material supply mechanism 17 by stopping execution of the supplying mechanism driving process in step S40. In step S30, when it is determined that the remaining amount of the plasticization material 18 is less than the second reference value, the control section 7 returns the process to step S20 and continues the supplying mechanism driving process.

Figure 11:
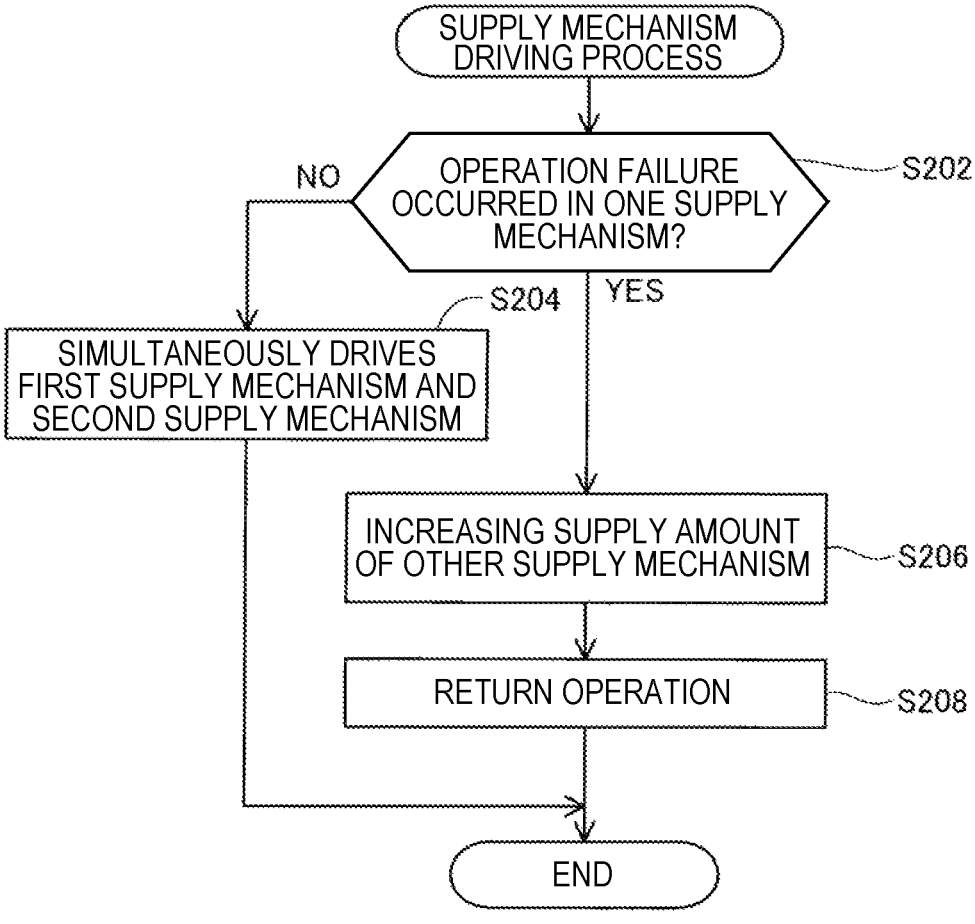
FIG. 11 is a flowchart showing a first example of the supply mechanism driving process.

FIG. 11 is a flowchart showing a first example of the supply mechanism driving process executed in step S20. In step S202, the control section 7 determines whether or not an operation failure such as biting has occurred in either the first supply mechanism 171 or the second supply mechanism 172. If it is determined that no operation failure has occurred in either of the supply mechanisms, the control section 7 simultaneously drives the first supply mechanism 171 and the second supply mechanism 172 in step S204. "Simultaneously drive" means that the first supply mechanism 171 and the second supply mechanism 172 are controlled so that at least a part of an operation of supplying the plasticization material 18 from the first input port 121 and at least a part of an operation of supplying the plasticization material 18 from the second input port 122 overlap each other. Specifically, the control section 7 drives the first slide drive section 174 and the second slide drive section 176 so that when the first slide member 173 is positioned in the +X direction, the second slide member is positioned in the +X direction, and when the first slide member is positioned in the −X direction, the second slide member is positioned in the −X direction. In this way, the plasticization material 18 is supplied to the connecting path 13a from the first supply mechanism 171 and the second supply mechanism 172 at substantially the same time.

When it is determined in step S202 that the operation failure has occurred in either of the supply mechanisms, the control section 7 drives the other supply mechanism in step S206 so that the supply amount of the plasticization material 18 by the other supply mechanism increases. Specifically, the movement amount of the slide member is adjusted such that the amount of plasticization material 18 introduced into the hole 31a of the slide member is increased. In this way, the control section 7 increases the supply amount of the plasticization material by the other supply mechanism so as to compensate for the supply amount of the plasticization material by the one supply mechanism in which an operation failure has occurred. Subsequently, in step S208, the control section 7 causes the supply mechanism that was detected as having an operation failure to perform the return operation described above.

Figure 12:
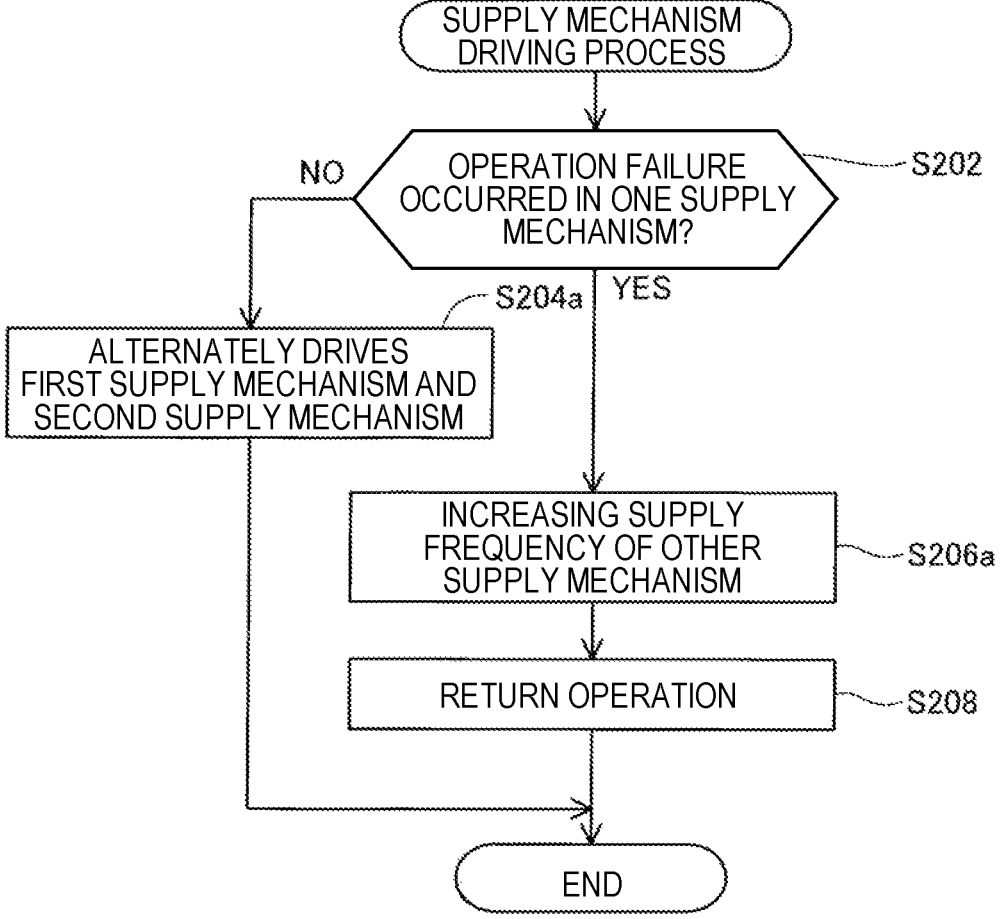
FIG. 12 is a flowchart showing a second example of the supply mechanism driving process.

FIG. 12 is a flowchart showing a second example of the supply mechanism driving process executed in step S20. In FIG. 12, the same step numbers are assigned to the same processing contents as those in FIG. 11. In step S20 shown in FIG. 10, the control section 7 executes either the supply mechanism driving process shown in FIG. 11 or the supply mechanism driving process shown in FIG. 12.

In step S202 of FIG. 12, the control section 7 determines whether or not the operation failure such as biting has occurred in either the first supply mechanism 171 or the second supply mechanism 172. If it is determined that no operation failure has occurred in either of the supply mechanisms, the control section 7 alternately drives the first supply mechanism 171 and the second supply mechanism 172 in step S204a. "Alternately drives" means that the first supply mechanism 171 and the second supply mechanism 172 are controlled so that the operation of supplying the plasticization material 18 from the first input port 121 and the operation of supplying the plasticization material 18 from the second input port 122 do not overlap. Specifically, the control section 7 drives the first slide drive section 174 and the second slide drive section 176 so that when the first slide member 173 is positioned in the +X direction, the second slide member is positioned in the −X direction, and when the first slide member is positioned in the −X direction, the second slide member is positioned in the +X direction. In this way, the plasticization material 18 is alternately supplied to the connecting path 13a from the first supply mechanism 171 and the second supply mechanism 172.

When it is determined in step S202 that the operation failure has occurred in either of the supply mechanisms, the control section 7 drives the other supply mechanism in step S206a so that the supply frequency of the plasticization material 18 by the other supply mechanism increases. Specifically, the reciprocating speed of the supply mechanism is increased to increase the number of reciprocations per unit of time. In this way, the control section 7 increases the supply amount of the plasticization material by the other supply mechanism so as to compensate for the supply amount of the plasticization material by the one supply mechanism in which an operation failure has occurred. Subsequently, in step S208, the control section 7 causes the supply mechanism that was detected as having an operation failure to perform the return operation described above.

By executing the material supply process described with reference to FIGS. 10 to 12, the control section 7 can supply the plasticization material 18 up to the second reference value using the first material sensor 23, the second material sensor 24, and the material supply mechanism 17.

In the present embodiment, as the first reference value and the second reference value, amounts are set that do not cause a bridge phenomenon. A bridge phenomenon is a phenomenon in which the plasticization material 18 interferes with each other and clogs due to the weight of the plasticization material 18 itself. The amount at which the bridge phenomenon does not occur can be determined by performing simulations or experiments in advance. According to the present embodiment, since the plasticization material 18 can be introduced until the amount obtained by adding the supply amount and the remaining amount of the plasticization material 18 reaches the second reference value, it is possible to reduce the supply frequency compared to a case where a small amount of the plasticization material 18 is supplied many times.

Figure 13:
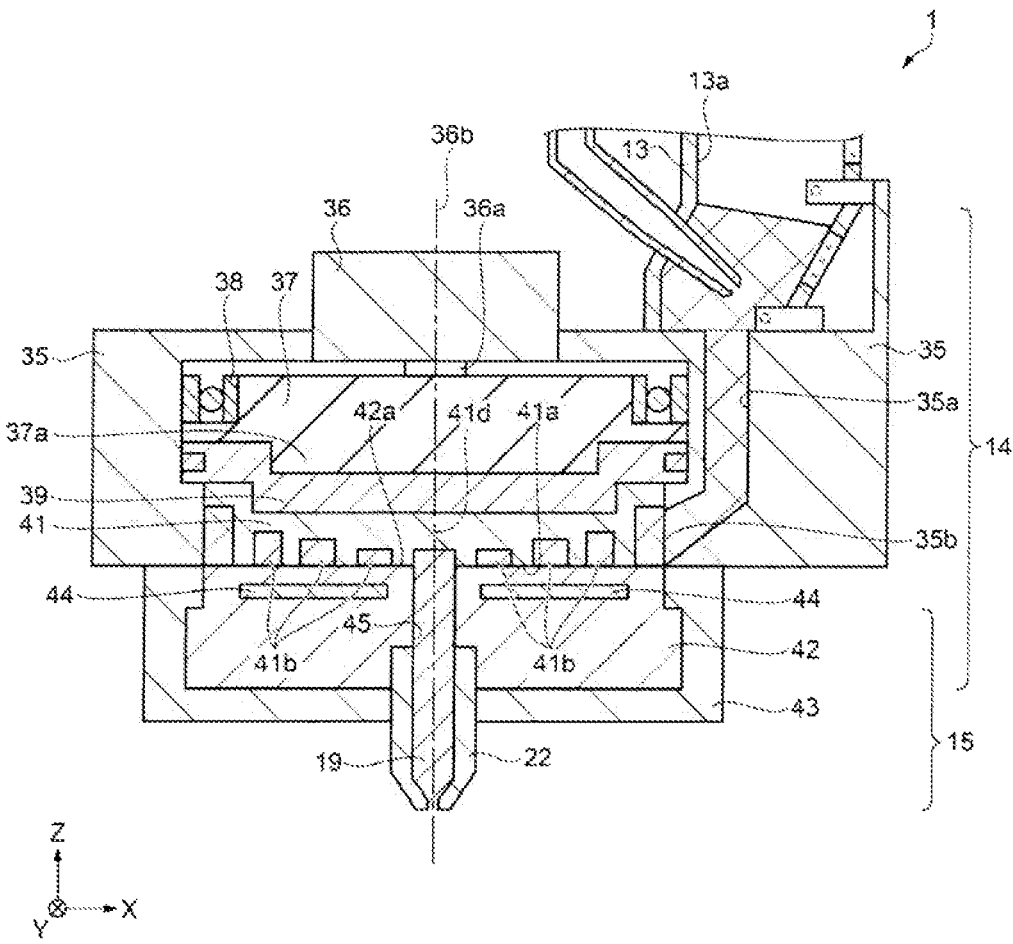
FIG. 13 is a side cross-sectional view schematically showing the structure of the plasticizing section.

FIG. 13 is a side cross-sectional view schematically showing the structure of the plasticizing section 14. The plasticizing section 14 includes a screw case 35. The inside of the screw case 35 is hollow. A motor 36 is installed on the +Z direction side of the screw case 35. The control section 7 controls the rotation angle, the rotation speed, the timing to start rotation, and the timing to stop rotation of the motor 36.

A deceleration device 37 is connected to a rotation shaft 36a of the motor 36. When the rotation shaft 36a rotates at a high speed, an outer circumferential side of the deceleration device 37 rotates at a reduced low speed. The outer circumferential side of the deceleration device 37 which rotates at a low speed serves as an output shaft 37a. A bearing 38 is provided on the outer circumferential side of the deceleration device 37. The bearing 38 is disposed between the screw case 35 and the deceleration device 37. The bearing 38 rotatably supports the deceleration device 37.

A screw support section 39 is installed on the output shaft 37a of the deceleration device 37. A flat screw 41 is installed in the screw support section 39. The flat screw 41 rotates in synchronization with the output shaft 37a. The flat screw 41 is rotated by the motor 36. A screw rotation center 41d, which is the rotation center of the flat screw 41, is coaxial with a motor rotation center 36b, which is the rotation center of the motor 36.

Figure 14:
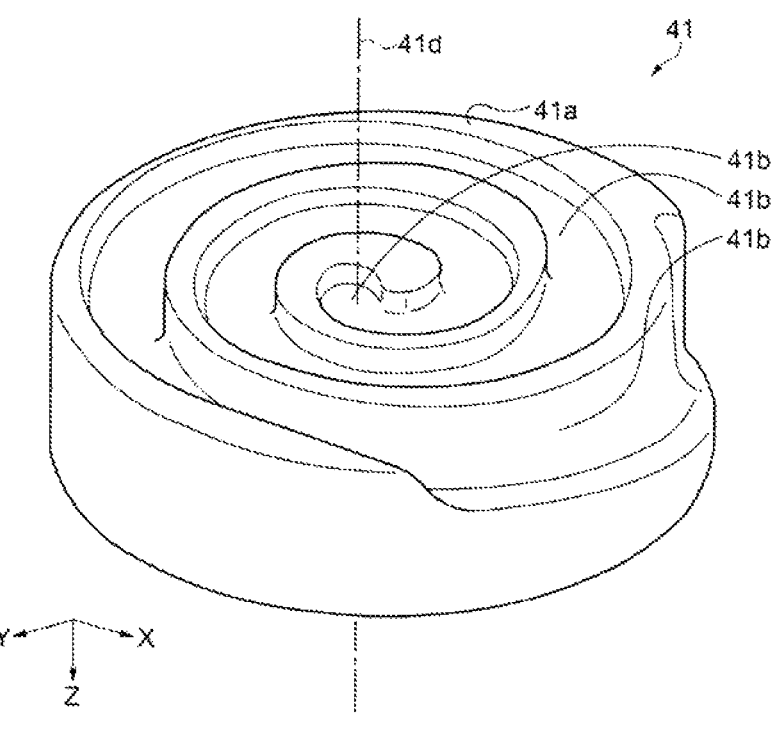
FIG. 14 is a schematic perspective view showing the configuration of a flat screw.

FIG. 14 is a schematic perspective view showing the configuration of the flat screw 41. The flat screw 41 has a groove forming surface 41a in which a helical-state groove 41b is formed. The flat screw 41 has a substantially cylindrical shape in which the size in the direction of a rotation shaft 36a is smaller than the size in the direction orthogonal to the direction of the rotation shaft 36a. In the shown example, one spiral-state groove 41b is provided. The number of the grooves 41b is not particularly limited. Although not shown, two or more grooves 41b may be provided. The shape of the groove 41b is not limited to a spiral-state shape and may be a helical-state shape or an involute curve-state shape. Further, the groove 41b may have a shape extending so as to draw an arc from the central portion toward the outer circumferential.

As shown in FIG. 13, the screw case 35 accommodates the deceleration device 37, the screw support section 39, and the flat screw 41. The screw case 35 includes a supply path 35a connected to the connecting pipe 13. The supply path 35a continues from the connecting pipe 13 to the flat screw 41. An opening of the supply path 35a on the flat screw 41 side is a passage opening 35b. The screw case 35 is provided with the passage opening 35b through which the plasticization material 18 passes toward the flat screw 41.

A barrel 42 is installed on the −Z direction side of the flat screw 41. A barrel case 43 for accommodating the barrel 42 is installed on the −Z direction side of the screw case 35. The flat screw 41 rotates with respect to the barrel 42.

The barrel 42 has a facing surface 42a that faces the groove forming surface 41a of the flat screw 41. A heater 44 is installed inside the barrel 42 at a place facing the groove 41b. The heater 44 heats the plasticization material 18 supplied between the groove forming surface 41a and the facing surface 42a. The heated plasticization material 18 is plasticized into a molding material 19. The barrel 42 is provided with a communication hole 45 into which the molding material 19 is obtained by plasticizing the plasticization material 18 flows.

Figure 15:
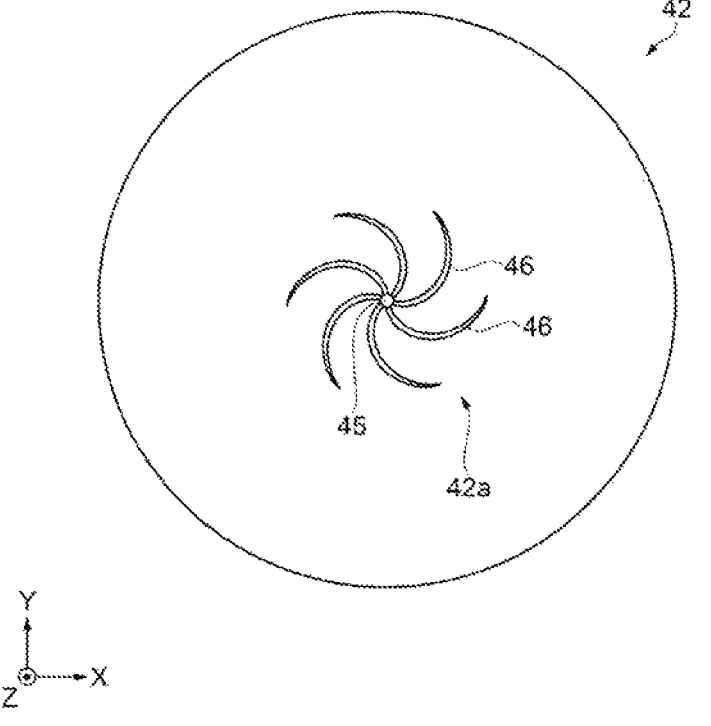
FIG. 15 is a schematic plan view showing the structure of a barrel.

FIG. 15 is a schematic plan view showing the structure of the barrel 42. A plurality of guide grooves 46 are formed around the communication hole 45 in the facing surface 42a of the barrel 42. Each of the guide grooves 46 has one end connected to the communication hole 45 and extends in a spiral-state shape from the communication hole 45 toward the outer circumferential of the facing surface 42a. Each of the guide grooves 46 guides the molding material 19 to the communication hole 45. One end of the guide groove 46 may not be connected to the communication hole 45. Further, the guide groove 46 may not be formed on the facing surface 42a.

As shown in FIG. 13, the depth of the groove 41b in the flat screw 41 is shallower on the side closer to the screw rotation center 41d than on the outer circumferential side. Therefore, the cross-sectional area of the groove 41b is smaller on the side closer to the screw rotation center 41d than on the outer circumferential side. The molding material 19 in the groove 41b has a high pressure on the side of the screw rotation center 41d and is pushed out to the communication hole 45. The flat screw 41 functions as a pump that moves the molding material 19.

In the present embodiment, since the plasticizing section 14 is configured to include the flat screw 41 and the barrel 42, the plasticizing section 14 can be reduced in size compared to a configuration in which the plasticizing section 14 is configured to include an inline screw.

According to the first embodiment described above, since the plasticizing device 21 includes the first supply mechanism 171 and the second supply mechanism 172, even when the operation failure occurs in either of the supply mechanisms, the plasticization material 18 can be supplied from the other supply mechanism. As a result, interruption of the molding of the three dimensional molded object 20 by the three dimensional molding device 1 can be suppressed.

Further, in the present embodiment, in both of the first state in which the plasticization material 18 is supplied to the connecting path 13a and the second state in which the plasticization material 18 is not supplied to the connecting path 13a, the hole 31a provided in the slide member communicates with the input port 120. Therefore, the slide member does not move across the input port 120 in the X direction in both cases where the slide member is slid in the +X direction and where the slide member is slid in the −X direction. As a result, biting of the plasticization material 18 in the slide member can be effectively suppressed. In particular, in the present embodiment, since the side surface of the hole 31a on the −X direction side is formed in an arcuate shape, biting of the plasticization material 18 in the corner portion of the hole 31a when the slide member is slid in the +X direction can be suppressed. Further, since the +X direction side of the hole 31a is open, biting does not occur when the slide member is slid in the –X direction.

In the present embodiment, in the supply mechanism driving process shown in FIGS. 11 and 12, when the operation failure occurs in either of the supply mechanisms, the supply amount of the plasticization material 18 by the other supply mechanism is increased, or the frequency of the supply is increased. Therefore, it is possible to prevent the supply of the plasticization material 18 to the plasticizing section 14 from becoming insufficient.

B. Second Embodiment

In the first embodiment described above, the first slide member 173 provided in the material supply mechanism 17 is connected to the first slide drive section 174, and the second slide member 175 is connected to the second slide drive section 176. That is, the slide drive section is connected to each of the slide members individually. On the other hand, in the second embodiment, the first slide member 173 and the second slide member 175 are connected to one slide drive section that slides both the first slide member 173 and the second slide member 175. The configuration of the second embodiment other than the material supply mechanism 17 is the same as that of the first embodiment.

Figure 16:
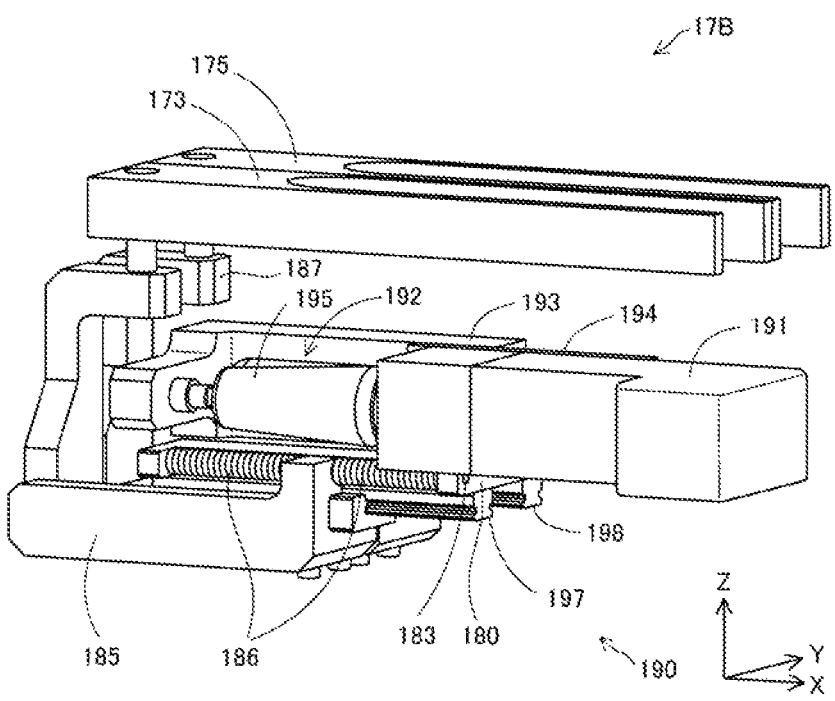
FIG. 16 is a perspective view showing the internal structure of the material supply mechanism in a second embodiment.
Figure 17:
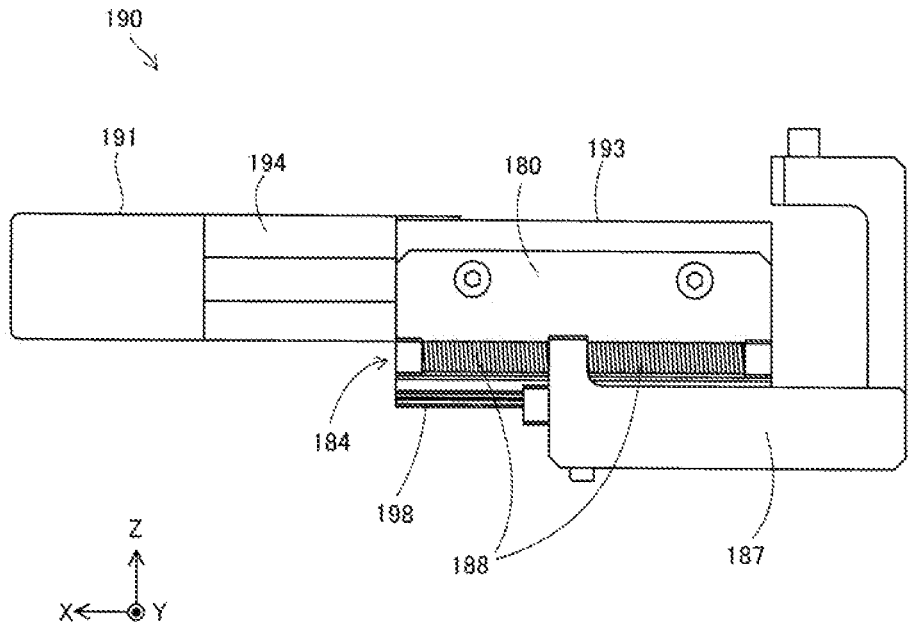
FIG. 17 is a side view of a slide drive section as viewed from a +Y direction.
Figure 18:
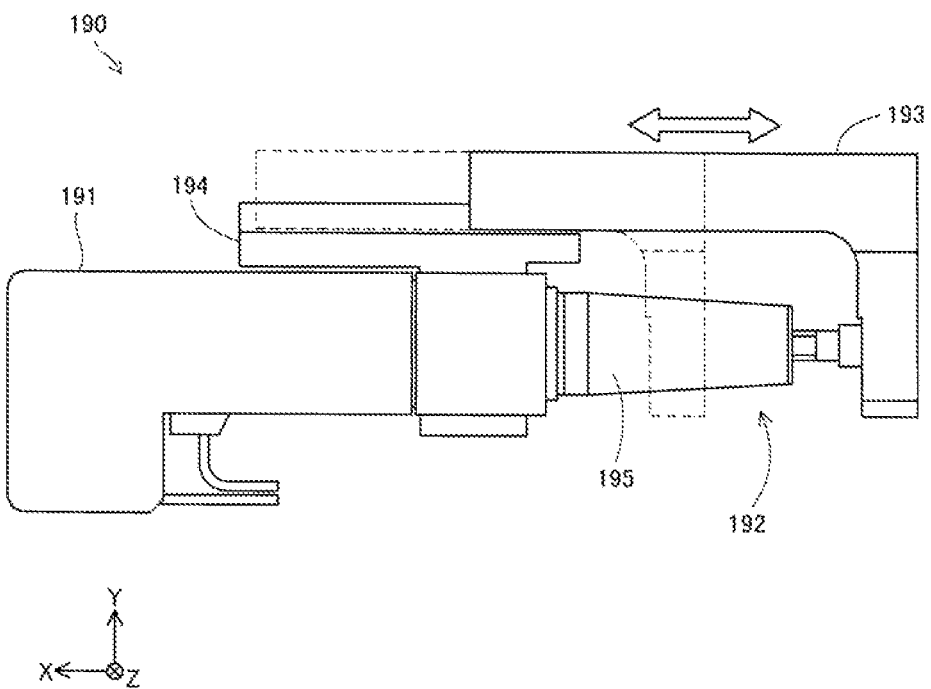
FIG. 18 is a bottom view of the slide drive section as viewed from a −Z direction.

FIG. 16 is a perspective view showing the internal structure of a material supply mechanism 17B in the second embodiment. The guide case 29 is not shown in FIG. 16. FIG. 17 is a side view of a slide drive section 190 as viewed from the +Y direction. FIG. 18 is a bottom view of the slide drive section 190 as viewed from the +Z direction. As shown in FIG. 16, the material supply mechanism 17B includes the first slide member 173, the second slide member 175, and the slide drive section 190.

The slide drive section 190 of the present embodiment is configured by an electric slider. As shown in FIGS. 16 to 18, the slide drive section 190 includes a motor 191, a ball screw 192, and a table 193. The motor 191 drives the ball screw 192 to reciprocate the table 193 coupled to the ball screw 192 via a ball screw nut along a table guide 194. In FIGS. 16 to 18, the ball screw 192 is covered by an extendable cover 195.

A base member 180 is fixed to the table 193. The lower end of the base member 180 has a surface facing in the –Y direction and a surface facing in the +Y direction. Both ends of a first shaft 183 extending along the X direction are fixed to the surface facing the –Y direction, and both ends of a second shaft 184 extending along the X direction are fixed to the surface facing the +Y direction.

The first shaft 183 supports an end portion of a first coupling member 185 connected to the first slide member 173. A through hole is provided along the X direction in an end portion of the first coupling member 185. The first shaft 183 passes through the through hole. Springs 186 as biasing members are disposed on the first shaft 183 on both the –X direction side and the +X direction side of the end portion of the first coupling member 185. The biasing member is not limited to the spring, and may be elastic rubber. The first slide member 173 and the first coupling member 185 are relatively movable in the X direction with respect to the base member 180 while being guided by the first guide 197 provided on the lower surface of the base member 180 and receiving the reaction force of the springs 186 along the first shaft 183.

The second shaft 184 supports an end portion of a second coupling member 187 connected to the second slide member 175. A through hole is provided along the X direction in an end portion of the second coupling member 187. The second shaft 184 passes through the through hole. Springs 188 as biasing members are disposed on the second shaft 184 on both the –X direction side and the +X direction side of the end portion of the second coupling member 187. The second slide member 175 and the second coupling member 187 are relatively movable in the X direction with respect to the base member 180 while being guided by the second guide 198 provided on the lower surface of the base member 180 and receiving the reaction force of the springs 188 along the second shaft 184.

When the control section 7 controls the motor 191 to move the table 193, the base member 180 fixed to the table 193 also moves together with the table 193. The first coupling member 185 is coupled to the base member 180 via the springs 186, and the second coupling member 187 is coupled to the base member 180 via the springs 188. Therefore, when the base member 180 moves, the first slide member 173 connected to the first coupling member 185, and the second slide member 175 connected to the second coupling member 187 simultaneously move in the same direction. At this time, when biting occurs in either of the first slide member 173 or the second slide member 175, the springs that sandwich the end portion of the coupling member connected to the slide member in which biting has occurred expand and contract. By the expansion and contraction of the springs, it is possible to stop movement of the slide member in which biting has occurred while allowing sliding movement of the slide member in which biting has not occurred.

According to the second embodiment described above, the first slide member 173 and the second slide member 175 can be driven by one slide drive section 190. In addition, even in a case where the operation failure occurs in either of the slide members due to biting or the like, the other slide member can be driven a single slide drive section 190, and thus it is possible to continue the supply of the plasticization material 18 using the slide member in which biting has not occurred. As a result, interruption of the molding of the three dimensional molded object 20 by the three dimensional molding device 1 can be suppressed.

In the second embodiment, the slide drive section 190 is configured by the electric slider. On the other hand, the slide drive section 190 may be constituted by an air cylinder with a table.

C. Third Embodiment

In the first embodiment described above, the same plasticization material 18 is introduced into the first supply mechanism 171 and the second supply mechanism 172 from the vessel 16 of the material storage section 12. On the other hand, in the third embodiment, different plasticization materials 18 can be introduced into the first supply mechanism 171 and the second supply mechanism 172. The configuration of the third embodiment other than the material storage section 12 is the same as that of the first embodiment.

Figure 19:
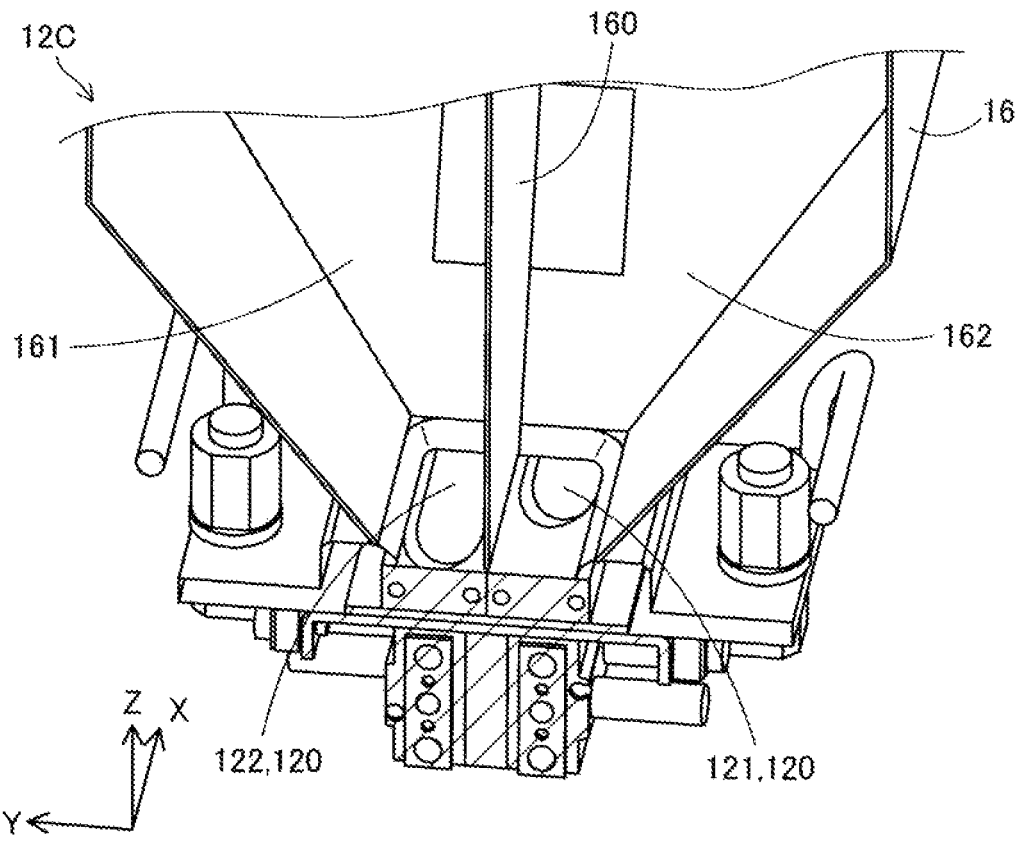
FIG. 19 is a cross-sectional perspective view showing an internal structure of a material storage section in a third embodiment.

FIG. 19 is a cross-sectional perspective view showing the internal structure of a material storage section 12C in the third embodiment. The material storage section 12C has a partition plate 160 extending upward between the first input port 121 and the second input port 122 inside. The partition plate 160 may be attachable and detachable. The position of the lower end of the partition plate 160 is substantially equal to the positions of the upper surfaces of the first slide member 173 and the second slide member 175. By this, the interior of the vessel 16 of the material storage section 12C is separated into a first accommodation chamber 161 and a second accommodation chamber 162 with the partition plate 160 interposed therebetween.

The first accommodation chamber 161 and the second accommodation chamber 162 can accommodate plasticization materials having different compositions and plasticization materials having different colors. For example, a plasticization material used for molding the main body of the three dimensional molded object 20 may be accommodated in the first accommodation chamber 161, and a plasticization material for supporting the overhang of the three dimensional molded object 20 may be accommodated in the second accommodation chamber 162.

According to the third embodiment described above, even when an operation failure occurs in either of the supply mechanisms, a different plasticization material can be supplied from the other supply mechanism to the plasticizing section 14. Therefore, the molding of the three dimensional molded object 20 can be continued by using a different plasticization material. In addition, in a case where no operation failure occurs in the supply mechanism, it is possible to supply a different plasticization material to the plasticizing section 14, and it is possible to easily switch the material.

D. Fourth Embodiment

In the first embodiment described above, the three dimensional molding device 1 is provided with the plasticizing device 21. On the other hand, in the fourth embodiment, a plasticizing device 51 is provided in an injection molding device 50.

Figure 20:
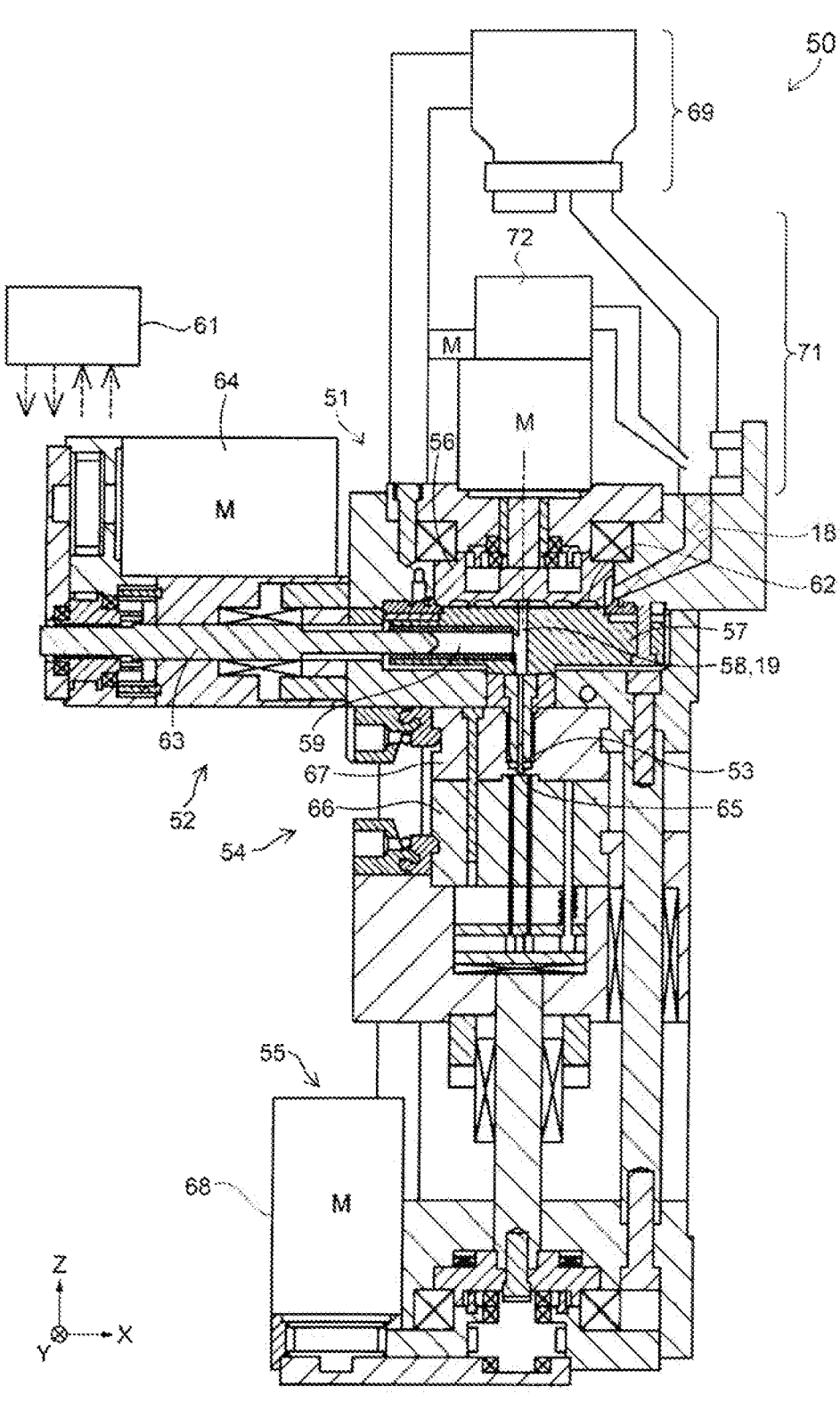
FIG. 20 is a schematic view showing a configuration of an injection molding device according to a fourth embodiment.

FIG. 20 is a schematic view showing a configuration of the injection molding device 50. The injection molding device 50 includes the plasticizing device 51, an injection control mechanism 52, a nozzle 53, a molding die 54, and a molding die clamping device 55. The plasticizing device 21 according to any one of the first to third embodiments is used as the plasticizing device 51.

The plasticizing device 51 includes a flat screw 56 and a barrel 57. An injection cylinder 59 is connected to a communication hole 58 of the barrel 57. Under the control of a control section 61, the plasticizing device 51 plasticizes the plasticization material 18 supplied to a groove section 62 of the flat screw 56, generates the paste-like molding material 19 having fluidity, and guides it from the communication hole 58 to the injection control mechanism 52.

In addition, the plasticizing device 51 includes a material storage section 69, a connecting pipe 71, and a blower section 72. The material storage section 69, the connecting pipe 71, and the blower section 72 respectively correspond to the material storage section 12, the connecting pipe 13, and the blower section 25 of the first embodiment.

The injection control mechanism 52 includes the injection cylinder 59, a plunger 63, and a plunger drive section 64. The injection control mechanism 52 injects the molding material 19 in the injection cylinder 59 into a cavity 65. The injection control mechanism 52 controls the injection amount of the molding material 19 injected from the nozzle 53 under the control of the control section 61. The injection cylinder 59 is a substantially cylindrical member connected to the communication hole 58 of the barrel 57 and has the plunger 63 inside. The plunger 63 slides inside the injection cylinder 59 and pumps the molding material 19 in the injection cylinder 59 to the nozzles 53 connected to the plasticizing device 51. The plunger 63 is driven by the plunger drive section 64, which is configured by a motor.

The molding die 54 is provided with a movable molding die 66 and a fixed molding die 67. The movable molding die 66 and the fixed molding die 67 are provided facing each other, and the cavity 65, which is a space corresponding to the shape of the molded article, is formed therebetween. The molding material 19 pumped by the injection control mechanism 52 is injected into the cavity 65 through the nozzle 53.

The molding die clamping device 55 includes a molding die drive section 68. The molding die drive section 68 performs opening and closing of the movable molding die 66 and the fixed molding die 67. Under the control of the control section 61, the molding die clamping device 55 drives the molding die drive section 68 to move the movable molding die 66 to open and close the movable molding die 66 and the fixed molding die 67.

In the injection molding device 50, the plasticizing device 21 according to the first embodiment is used as the plasticizing device 51. The injection molding device 50 includes the nozzle 53 that injects the molding material 19 supplied from the plasticizing device 51 toward the molding die 54.

According to this configuration, even when an operation failure occurs in either of the two supply mechanisms provided in the plasticizing device 51, the plasticization material can be supplied from the other supply mechanism to the plasticizing device 51, so that it is possible to suppress the interruption of the manufacturing of the molded article by the injection molding device 50 when the operation failure occurs in one of the supply mechanisms.

E. Other Embodiments (E1) In the first embodiment, the XY table 3 moves the stage 6 in the X direction and the Y direction, and the raising/lowering table 8 moves the ejection section 15 in the Z direction. In addition, a raising/lowering table for moving the stage 6 in the Z direction and an XY table for moving the ejection section 15 in the X direction and the Y direction may be provided. In addition, an XYZ table that moves the ejection section 15 in the X direction, the Y direction, and the Z direction may be provided, and the stage 6 not moved. In addition, an XYZ table that moves the stage 6 in the X direction, the Y direction, and the Z direction may be provided, and the ejection section 15 not moved. With any of the configurations, the three dimensional molded object 20 can be formed on the stage 6.

(E2) In the first embodiment, the material storage section 12 of the plasticizing device 21 includes the first input port 121 provided corresponding to the first supply mechanism 171, and the second input port 122 provided corresponding to the second supply mechanism 172. On the other hand, the material storage section 12 may include only one input port 120. In this case, the input port 120 is formed so as to communicate with both the hole 31a of the first slide member 173 and the hole 31a of the second slide member 175. In such a configuration, the portion of the input port 120 communicating with the hole 31a of the first slide member 173 corresponds to the first input port 121, and the portion communicating with the hole 31a of the first slide drive section 174 corresponds to the second input port 122.

(E3) In the first embodiment, the side surface on the −X direction side of the hole 31a of the slide member is curved in a semicircular arc shape as viewed from the +Z direction. In contrast to this, the side surface of the first slide member 173 on the −X direction side may have a linear shape that intersects the X direction as viewed from the +Z direction. In the first embodiment, the side surface of the first slide member 173 on the +X direction side is open. In contrast, the side surface of the first slide member 173 on the +X direction side may not be opened, and the hole 31*a* may be surrounded.

(E4) In the first embodiment, the hole 31*a* of each slide member has a size that communicates with the input port 120 in both states of the first state in which the plasticization material 18 is supplied to the connecting path 13*a* and the second state in which the plasticization material 18 is not supplied to the connecting path 13*a*. On the other hand, the hole 31*a* may have a size that communicates with the input port 120 in the first state and does not communicate with the input port 120 in the second state.

(E5) In the first embodiment, the first material sensor 23 and the second material sensor 24 may be omitted. Further, the blower section 25 and the ionizer 28 may be omitted.

(E6) In the first embodiment, the plasticization material 18 is temporarily stored between the first material sensor 23 and the second material sensor 24 provided in the lower portion of the connecting pipe 13 and the plasticization material 18 is supplied to the plasticizing section 14 through the supply port 14*a*. In contrast, the plasticization material 18 may be directly supplied from the connecting pipe 13 to the plasticizing section 14 through the supply port 14*a* without being temporarily stored in the connecting pipe 13. In this case, in the material supply process shown in FIG. 10, only the supply mechanism driving process in step S20 is executed. In such an aspect, if step S206 shown in FIG. 11 or step S206*a* shown in FIG. 12 is executed, since the supply amount of the plasticization material 18 can be increased or the supplying frequency can be increased by the supplying mechanism in which biting does not occur, it is possible to suppress the generation shortage of the molding material 19 from occurring.

(E7) In the first embodiment, the material supply mechanism 17 includes two supply mechanisms. In contrast, the material supply mechanism 17 may include three or more supply mechanisms.

(E8) Although the control section 7 drives both the first supply mechanism 171 and the second supply mechanism 172 in the material supply process of the first embodiment, it is not necessary to control both the first supply mechanism 171 and the second supply mechanism 172 to supply the plasticization material 18. For example, only one of the supply mechanisms may be controlled to supply the plasticization material 18. In this case, the other supply mechanism may be used as a spare in the case where one supply mechanism fails.

F. Other Configurations

The present disclosure is not limited to the above described embodiments, and can be realized in various configurations without departing from the spirit thereof. For example, the technical features of the embodiments corresponding to the technical features in each aspect described below can be appropriately replaced or combined in order to solve a part or all of the problems described above or in order to achieve a part or all of the effects described above. In addition, unless the technical features are described as essential in the present specification, the technical features can be appropriately deleted.

(1) According to a first aspect of the present disclosure, a plasticizing device is provided.

This plasticizing device includes a material storage section having a first input port and a second input port and storing plasticization material; a plasticizing section that has a supply port to which the plasticization material is supplied and that plasticizes at least part of the plasticization material to generate a molding material; a connecting pipe having a connecting path connecting the first input port and the second input port to the supply port; and a control section, wherein the material storage section includes a first supply mechanism configured to adjust the supply amount of the plasticization material from the first input port to the connecting path and a second supply mechanism configured to adjust the supply amount of the plasticization material from the second input port to the connecting path and the control section controls at least one of the first supply mechanism and the second supply mechanism to supply the plasticization material to the connecting path.

According to such an aspect, the plasticization material can be supplied to the plasticizing section by the two supply mechanisms. Therefore, even when the operation failure occurs in one supply mechanism, the plasticization material can be supplied from the other supply mechanism. As a result, interruption of molding of the three dimensional molded object by the three dimensional molding device or manufacturing of the molded article by the injection molding device can be suppressed.

(2) The plasticizing device according to the above aspect may be such that the first supply mechanism includes a slide member having a hole through which the plasticization material passes and a slide drive section configured to slide the slide member, the control section is configured to switch between a first state in which the plasticization material is supplied to the connecting path and a second state in which the plasticization material is not supplied to the connecting path by controlling the slide drive section, and the hole of the slide member communicates with the first input port in both the first state and the second state.

According to such an aspect, it is possible to suppress the plasticization material from biting in the slide member when the slide member is slid.

(3) The plasticizing device according to the above aspect may be such that the material storage section has a partition plate extending upward between the first input port and the second input port.

According to such an aspect, different plasticization materials can be stored in the two accommodation chambers separated by the partition plate.

(4) The plasticizing device according to the above aspect may be such that the first supply mechanism has a first slide member having a first hole through which the plasticization material passes, the second supply mechanism has a second slide member having a second hole through which the plasticization material passes, and the first slide member and the second slide member are connected to a slide drive section that slides the first slide member and the second slide member via biasing members.

According to such an aspect, two slide members can be driven by one slide drive section. In addition, even when an operation failure occurs in either of the first slide member and the second slide member due to biting or the like, the other slide member can be driven by one slide drive section.

(5) The plasticizing device according to the above aspect may be such that the control section is configured to control the first supply mechanism and the second supply mechanism such that at least a part of an operation of supplying the plasticization material from the first input port and at least a part of an operation of supplying the plasticization material from the second input port overlap each other and the control section is configured to increase, when an operation failure of either of the first supply mechanism and the second supply mechanism is detected, the supply amount of the plasticization material by the other supply mechanism in which the operation failure is not detected.

According to such an aspect, in a case where an operation failure occurs in either of the supply mechanisms of the first supply mechanism or the second supply mechanism, it is possible to suppress insufficient supply of the plasticization material to the plasticizing section.

(6) The plasticizing device according to the above aspect may be such that the control section is configured to control the first supply mechanism and the second supply mechanism so that an operation of supplying the plasticization material from the first input port and an operation of supplying the plasticization material from the second input port do not overlap and the control section is configured to, when an operation failure is detected in either the first supply mechanism or the second supply mechanism, increase the supply frequency of the plasticization material by the other supply mechanism in which the operation failure is not detected.

According to such an aspect, in a case where an operation failure occurs in either of the supply mechanisms of the first supply mechanism or the second supply mechanism, it is possible to suppress insufficient supply of the plasticization material to the plasticizing section.

(7) According to a second aspect of the present disclosure, a three dimensional molding device is provided.

This three dimensional molding device includes above described plasticizing device and a nozzle configured to eject the molding material toward a stage.

(8) According to a third aspect of the present disclosure, an injection molding device is provided.

This Injection molding device includes above described plasticizing device and a nozzle configured to inject the molding material into a molding die.

The present disclosure is not limited to the aspects of the plasticizing device, the three dimensional molding device, and the injection molding device described above, and can be realized by various aspects such as a method of supplying a plasticization material and a method of plasticizing a plasticization material.

What is claimed is:

1. A plasticizing device comprising:
a material storage section having a first input port and a second input port and storing plasticization material, the first and second input ports being arranged side by side in a plan view;
a plasticizing section that has a supply port to which the plasticization material is supplied and that plasticizes at least part of the plasticization material to generate a molding material;
a connecting pipe having a connecting path connecting the first input port and the second input port to the supply port, the first and second input ports being connected to the connecting path at a same location; and
a control section, wherein
the material storage section includes a first supply mechanism configured to adjust a supply amount of the plasticization material from the first input port to the connecting path and a second supply mechanism configured to adjust the supply amount of the plasticization material from the second input port to the connecting path, the control section controls at least one of the first supply mechanism and the second supply mechanism to supply the plasticization material to the connecting path, the first supply mechanism has a first slide member having a first hole through which the plasticization material passes, the second supply mechanism has a second slide member having a second hole through which the plasticization material passes, and the first slide member and the second slide member are connected to a slide drive section that slides the first slide member and the second slide member via biasing members.

2. The plasticizing device according to claim 1, wherein the first supply mechanism includes a first slide drive section configured to slide the first slide member,
the second supply mechanism includes a second slide drive section configured to slide the second slide member,
the control section is configured to control at least one of the first slide drive section and the second slide drive section to switch between a first state in which the plasticization material is supplied to the connecting path and a second state in which the plasticization material is not supplied to the connecting path, and
the first and second holes of the first and second slide members respectively communicate with the first and second input ports in both the first state and the second state.

3. The plasticizing device according to claim 1, wherein the material storage section has a partition plate extending upward between the first input port and the second input port.

4. The plasticizing device according to claim 1, wherein the control section is configured to control the first supply mechanism and the second supply mechanism such that at least a part of an operation of supplying the plasticization material from the first input port and at least a part of an operation of supplying the plasticization material from the second input port overlap each other, and
the control section is configured to, when an operation failure of one of the first supply mechanism and the second supply mechanism is detected, increase the supply amount of the plasticization material by the other of the first supply mechanism and the second supply mechanism in which an operation failure is not detected.

5. The plasticizing device according to claim 1, wherein the control section is configured to control the first supply mechanism and the second supply mechanism so that an operation of supplying the plasticization material from the first input port and an operation of supplying the plasticization material from the second input port do not overlap, and
the control section is configured to, when an operation failure is detected in one of the first supply mechanism and the second supply mechanism, increase the supply frequency of the plasticization material by the other of the first supply mechanism and the second supply mechanism in which an operation failure is not detected.

6. A three dimensional molding device comprising:
the plasticizing device according to claim 1, and
a nozzle configured to eject the molding material toward a stage.

7. A plasticizing device comprising:

a material storage section having a first input port and a second input port and storing plasticization material;

a plasticizing section that has a supply port to which the plasticization material is supplied and that plasticizes at least part of the plasticization material to generate a molding material;

a connecting pipe having a connecting path connecting the first input port and the second input port to the supply port; and a control section, wherein the material storage section includes a first supply mechanism and a second supply mechanism, the first supply mechanism is configured to adjust a supply amount of the plasticization material from the first input port to the connecting path, and the second supply mechanism is configured to adjust the supply amount of the plasticization material from the second input port to the connecting path, the first supply mechanism has a first slide member having a first hole through which the plasticization material passes, and the first slide member is spaced apart from the connection pipe, the second supply mechanism has a second slide member having a second hole through which the plasticization material passes, and the second slide member is spaced apart from the connection pipe, and the control section controls at least one of the first supply mechanism and the second supply mechanism to supply the plasticization material to the connecting path.

8. The plasticizing device according to claim 7, wherein the material storage section has a partition plate extending upward between the first input port and the second input port.

9. The plasticizing device according to claim 7, wherein the first slide member and the second slide member are connected to a slide drive section that slides the first slide member and the second slide member via biasing members.

10. The plasticizing device according to claim 7, wherein the control section is configured to control the first supply mechanism and the second supply mechanism such that at least a part of an operation of supplying the plasticization material from the first input port and at least a part of an operation of supplying the plasticization material from the second input port overlap each other, and the control section is configured to, when an operation failure of one of the first supply mechanism and the second supply mechanism is detected, increase the supply amount of the plasticization material by the other of the first supply mechanism and the second supply mechanism in which an operation failure is not detected.

11. The plasticizing device according to claim 7, wherein the control section is configured to control the first supply mechanism and the second supply mechanism so that an operation of supplying the plasticization material from the first input port and an operation of supplying the plasticization material from the second input port do not overlap, and the control section is configured to, when an operation failure is detected in one of the first supply mechanism and the second supply mechanism, increase the supply frequency of the plasticization material by the other of the first supply mechanism and the second supply mechanism in which an operation failure is not detected.

12. A three dimensional molding device comprising:

the plasticizing device according to claim 7, and a nozzle configured to eject the molding material toward a stage.

* * * * *